US012663288B2

(12) United States Patent　　(10) Patent No.:　US 12,663,288 B2
Xia et al.　　(45) Date of Patent: 　　Jun. 23, 2026

(54) SENSOR FUSION FOR DYNAMIC MAPPING

(71) Applicant: MITSUBISHI ELECTRIC CORPORATION, Tokyo (JP)

(72) Inventors: Zhenchun Xia, San Jose, CA (US); Kuen Yehliu, Ann Arbor, MI (US)

(73) Assignee: Mitsubishi Electric Corporation, Tokyo (JP)

( * ) Notice: Subject to any disclaimer, the term of this patent is extended or adjusted under 35 U.S.C. 154(b) by 474 days.

(21) Appl. No.: 17/112,382

(22) Filed: Dec. 4, 2020

(65) Prior Publication Data

US 2022/0178718 A1　　Jun. 9, 2022

(51) Int. Cl.
*G01C 21/00*　　(2006.01)
*B60W 50/14*　　(2020.01)
　　　　(Continued)

(52) U.S. Cl.
CPC ......... *G01C 21/3841* (2020.08); *B60W 50/14* (2013.01); *B60W 60/00256* (2020.02);
　　　　(Continued)

(58) Field of Classification Search
CPC ............ G01C 21/3841; G01C 21/3407; G01C 21/3626; G01C 21/3815; G01C 21/3885; B60W 50/14; B60W 60/00256; B60W 2050/146; B60W 2420/52; B60W 2520/10; B60W 2556/50; B60W 2556/65; G06K 9/6288; G06T 7/277; G06T 2207/10028;
　　　　(Continued)

(56) References Cited

U.S. PATENT DOCUMENTS

2018/0189601 A1*　7/2018　Dabeer ................ G06K 9/6215
2019/0265330 A1*　8/2019　Rajendran ............ G01S 13/867
　　　　(Continued)

FOREIGN PATENT DOCUMENTS

CN　　108010360 A　　5/2018
CN　　109996176 A　　7/2019
　　　　(Continued)

OTHER PUBLICATIONS

Sun et al. An Improved Lidar Data Segmentation Algorithm Based on Euclidean Clustering (Year: 2020).*
　　　　(Continued)

*Primary Examiner* — Ramya P Burgess
*Assistant Examiner* — Chanmin Park
(74) *Attorney, Agent, or Firm* — Sughrue Mion, PLLC

(57)　　　ABSTRACT

A local computing device receives lidar data and radar data from one or more road side units (RSUs). The local computing device performs ground plane removal based on range to detect targets and perform local sensor fusion. The local computing device may use a global nearest neighbor (GNN) algorithm and a Kalman filter. The local computing device may create an HD map or the data may be brought together with other target data at a central computing device to produce the HD map. Vehicle position and motion are controlled based on the HD map. Detecting and removing a ground plane based on range are illustrated. Fusion, ground plane removal, and delay filtering may be used in various contexts, such as roadways, parking lots and shipping yards.

20 Claims, 20 Drawing Sheets

(51) Int. Cl.

| | |
|---|---|
| *B60W 60/00* | (2020.01) |
| *G01C 21/34* | (2006.01) |
| *G01C 21/36* | (2006.01) |
| *G06F 18/25* | (2023.01) |
| *G06T 7/277* | (2017.01) |
| *G08G 1/0968* | (2006.01) |
| *G08G 1/0969* | (2006.01) |

(52) U.S. Cl.
CPC ..... *G01C 21/3407* (2013.01); *G01C 21/3626* (2013.01); *G01C 21/3815* (2020.08); *G01C 21/3885* (2020.08); *G06F 18/25* (2023.01); *G06T 7/277* (2017.01); *G08G 1/096805* (2013.01); *G08G 1/096833* (2013.01); *G08G 1/0969* (2013.01); *B60W 2050/146* (2013.01); *B60W 2420/408* (2024.01); *B60W 2520/10* (2013.01); *B60W 2556/50* (2020.02); *B60W 2556/65* (2020.02); *G06T 2207/10028* (2013.01); *G06T 2207/10044* (2013.01); *G06T 2207/30252* (2013.01)

(58) Field of Classification Search
CPC ........... G06T 2207/10044; G06T 2207/30252; G08G 1/096805; G08G 1/096833; G08G 1/0969

See application file for complete search history.

(56) References Cited

U.S. PATENT DOCUMENTS

| | | |
|---|---|---|
| 2019/0392712 A1 | 12/2019 | Ran et al. |
| 2020/0090511 A1 | 3/2020 | Tao et al. |
| 2021/0005085 A1* | 1/2021 | Cheng .................. G08G 1/0141 |
| 2021/0199442 A1* | 7/2021 | Xie ...................... G06V 20/588 |
| 2021/0216814 A1* | 7/2021 | Li ........................ G06V 10/763 |
| 2022/0063612 A1* | 3/2022 | Pandita ............. G01C 21/3407 |
| 2022/0111868 A1* | 4/2022 | Costea ................ G06V 10/764 |

FOREIGN PATENT DOCUMENTS

| | | |
|---|---|---|
| CN | 110544376 A | 12/2019 |
| CN | 110599762 A | 12/2019 |
| JP | 2013228259 A * | 11/2013 |

OTHER PUBLICATIONS

Yuanchang Xie, Data Analytics for Intelligent Transportation Systems, (Year: 2017).*

Anum Ali et al., "Leveraging Sensing at the Infrastructure for mmWave Communication", IEEE Communications Magazine, 2020, 14 pages, vol. 58, Issue: 7.

Josef Steinbaek et al., "Design of a Low-Level Radar and Time-of-Flight Sensor Fusion Framework", 21st Euromicro Conference on Digital System Design (DSD), 2018, 9 pages.

Bob Collins et al., "Introduction to Data Association", CSE598C Fall 2012, 2012, 45 pages.

Greg Welch et al., "An Introduction to the Kalman Filter", SIG-GRAPH 2001 Course 8, 2001, 81 pages.

P. H. S. Torr et al., "MLESAC: A New Robust Estimator with Application to Estimating Image Geometry", Computer Vision and Image Understanding 78, 2000, pp. 138-156.

* cited by examiner

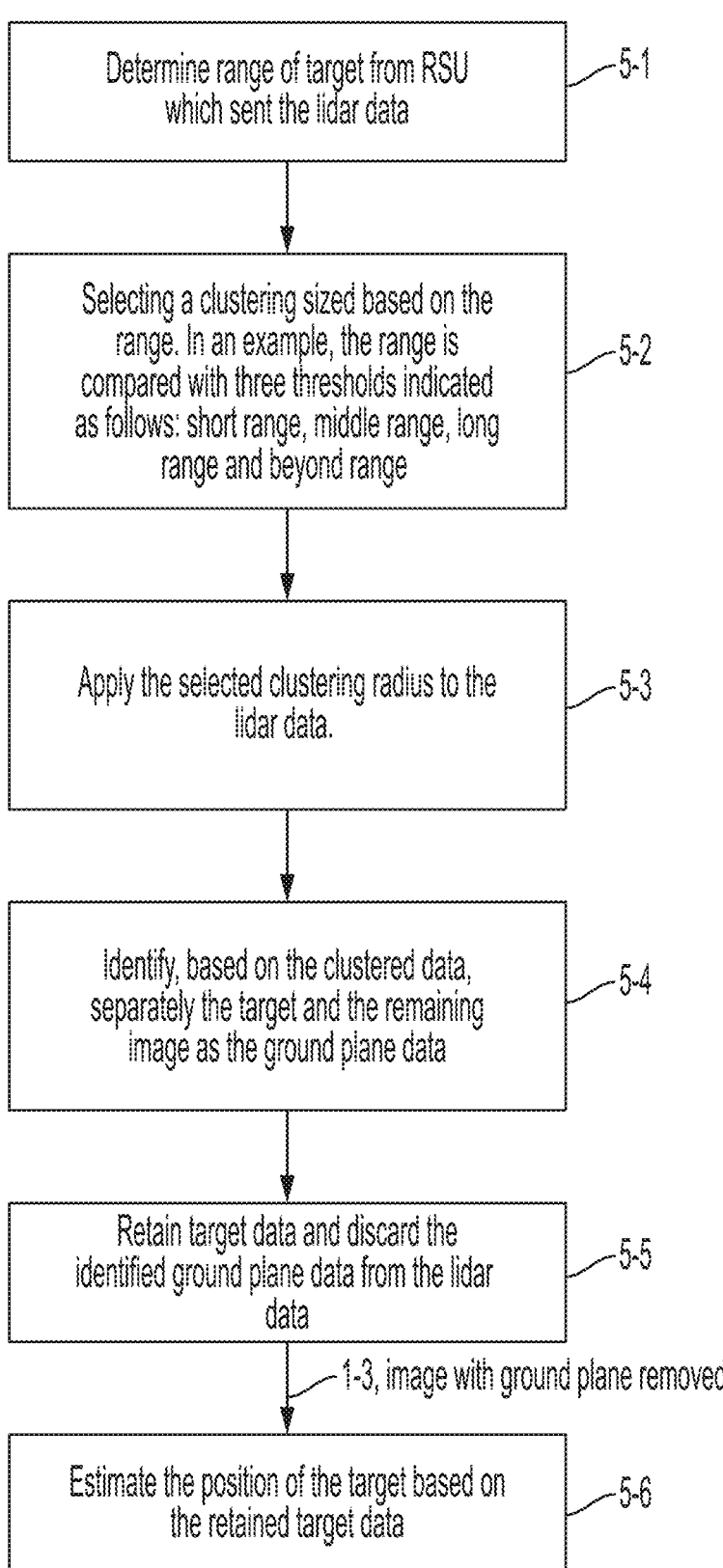

Determine range of target from RSU which sent the lidar data 5-1

Selecting a clustering sized based on the range. In an example, the range is compared with three thresholds indicated as follows: short range, middle range, long range and beyond range 5-2

Apply the selected clustering radius to the lidar data. 5-3

Identify, based on the clustered data, separately the target and the remaining image as the ground plane data 5-4

Retain target data and discard the identified ground plane data from the lidar data 5-5

1-3, image with ground plane removed

Estimate the position of the target based on the retained target data 5-6

FIG. 5A

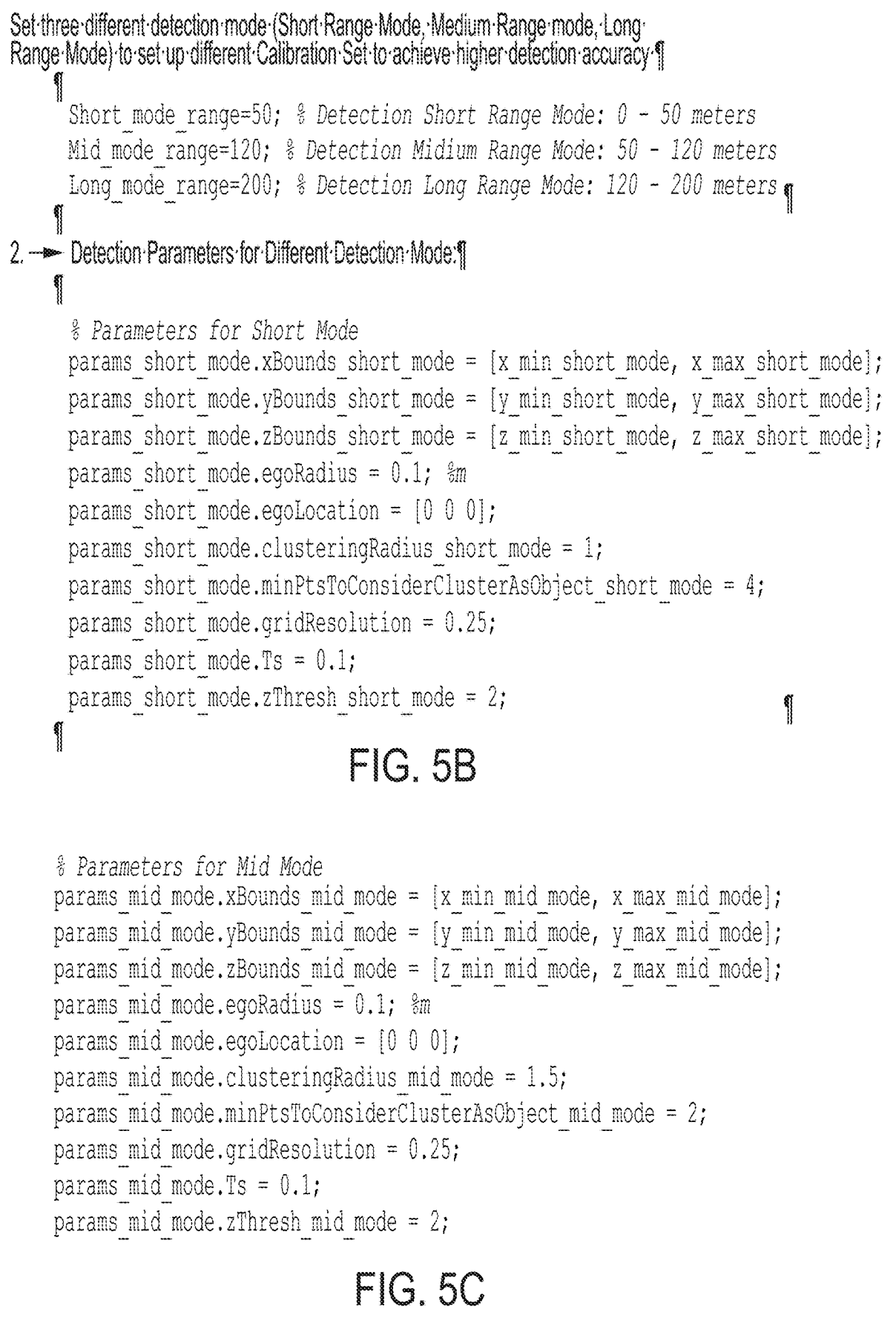

Set three different detection mode (Short Range Mode, Medium Range mode, Long Range Mode) to set up different Calibration Set to achieve higher detection accuracy

```
    Short_mode_range=50;  % Detection Short Range Mode: 0 - 50 meters
    Mid_mode_range=120;  % Detection Midium Range Mode: 50 - 120 meters
    Long_mode_range=200;  % Detection Long Range Mode: 120 - 200 meters
```

2. → Detection Parameters for Different Detection Mode.

```
    % Parameters for Short Mode
    params_short_mode.xBounds_short_mode = [x_min_short_mode, x_max_short_mode];
    params_short_mode.yBounds_short_mode = [y_min_short_mode, y_max_short_mode];
    params_short_mode.zBounds_short_mode = [z_min_short_mode, z_max_short_mode];
    params_short_mode.egoRadius = 0.1;  %m
    params_short_mode.egoLocation = [0 0 0];
    params_short_mode.clusteringRadius_short_mode = 1;
    params_short_mode.minPtsToConsiderClusterAsObject_short_mode = 4;
    params_short_mode.gridResolution = 0.25;
    params_short_mode.Ts = 0.1;
    params_short_mode.zThresh_short_mode = 2;
```

FIG. 5B

```
    % Parameters for Mid Mode
    params_mid_mode.xBounds_mid_mode = [x_min_mid_mode, x_max_mid_mode];
    params_mid_mode.yBounds_mid_mode = [y_min_mid_mode, y_max_mid_mode];
    params_mid_mode.zBounds_mid_mode = [z_min_mid_mode, z_max_mid_mode];
    params_mid_mode.egoRadius = 0.1;  %m
    params_mid_mode.egoLocation = [0 0 0];
    params_mid_mode.clusteringRadius_mid_mode = 1.5;
    params_mid_mode.minPtsToConsiderClusterAsObject_mid_mode = 2;
    params_mid_mode.gridResolution = 0.25;
    params_mid_mode.Ts = 0.1;
    params_mid_mode.zThresh_mid_mode = 2;
```

FIG. 5C

```
% Parameters for Long Mode
params_long_mode.xBounds_long_mode = [x_min_long_mode, x_max_long_mode];
params_long_mode.yBounds_long_mode = [y_min_long_mode, y_max_long_mode];
params_long_mode.zBounds_long_mode = [z_min_long_mode, z_max_long_mode];
params_long_mode.egoRadius = 0.1;  %m
params_long_mode.egoLocation = [0 0 0];
params_long_mode.clusteringRadius_long_mode = 3;
params_long_mode.minPtsToConsiderClusterAsObject_long_mode = 2;
params_long_mode.gridResolution = 0.25;
params_long_mode.Ts = 0.1;
params_long_mode.zThresh_long_mode = 2;
```

FIG. 5D 3-1

1-7, lidar point clouds (radar data not shown)

1-3, image with ground plane removed

1

SENSOR FUSION FOR DYNAMIC MAPPING

FIELD

The subject matter of this application is related to detection, tracking, and control of autonomous vehicles.

BACKGROUND

Some systems track progress of autonomous vehicles. An autonomous vehicle may have little or no input from a driver. Systems may include road side units (RSUs). An RSU may include one or more sensors such as lidar and radar to collect signals related to the progress of autonomous vehicles.

In using a lidar sensor, light is emitted from a laser. The laser light travels outward and reflects off of things or is scattered by reflection. Some reflected or scattered laser light then returns to the lidar sensor where it is sampled. In general, a collection of scattered laser light representing a shape or feature may be referred to as a point cloud.

In using a radar sensor, radio waves are used to determine the range, angle, or velocity of objects. Radio waves from a transmitter reflect off objects or is scattered. Some scattered radio waves return to the radar sensor, where they are sampled.

Information from lidar and radar sensors may be used to help the autonomous vehicles navigate in an environment with obstacles. The autonomous vehicles may be controlled to avoid collision with the obstacles.

Scattering and reflections occur from both objects on the ground and a road or pavement surface. The road or pavement surface, in terms of the received scattered or reflected energy may be referred to as a ground plane.

SUMMARY

The vehicles may be in a roadway, in a parking lot or in a shipping yard. The vehicles follow drive paths. There may be objects near the vehicles such as trees.

Problems

Lack of precision in detecting and tracking vehicles can lead to a vehicle being in the wrong place or can reduce the number of vehicles which can be deployed.

Detection and tracking can be degraded by inaccuracies when removing image data corresponding to a ground plane from a lidar point cloud.

Delays in data observations flowing in for processing can cause mistaken association of data or missed opportunities to associate data from different RSUs.

Solutions

The solution of the application, in some embodiments, performs local sensor fusion from sensors such as lidar sensors and radar sensors. A road side unit (RSU) includes a lidar and radar sensor, and several RSUs are deployed near the roadway or around the parking lot or around the shipping yard. The system includes at least one local computing device. In some embodiments, the system includes a number of local computing devices and a central computing device. The system, in some embodiments, includes a vehicle control device installed in one or more autonomous vehicles.

Provided herein is a method for producing a high definition map (HD map) for control of one or more autonomous vehicles, the one or more autonomous vehicles including a first vehicle, the method comprising: receiving, at a local computing device, first lidar data and first radar data related to the first vehicle; performing a local sensor fusion at the local computing device, wherein the local sensor fusion includes removing, based on a range to the first vehicle, a ground plane associated with the first vehicle, and determining, based on the local sensor fusion, the HD map, wherein the HD map indicates a position and a velocity of the first vehicle.

In some embodiments, the method further includes controlling, based on the position and the velocity indicated by the HD map, the first vehicle to navigate in a parking lot to pick up or drop off a person.

In some embodiments, the method further includes controlling, based on the position and the velocity indicated by the HD map, the first vehicle to navigate in a shipping yard to pick up or drop off a shipment.

In some embodiments, the method further includes receiving, at the local computing device, second lidar data and second radar data related to the first vehicle, wherein the performing the local sensor fusion further comprises: applying a delay filter to compare timestamps of the first lidar data and the second lidar data, discarding the second lidar data when the comparison of the timestamps indicates a difference in timestamps more than a threshold time, and using, when the difference in timestamps is equal to or less than the threshold time, the second lidar data as an input of the local sensor fusion.

In some embodiments, the method further includes forming visual display data based on the RD map; sending the visual display data to a display device; and displaying the visual display data on the display device for monitoring, by a person, of the first vehicle.

In some embodiments, the method further includes determining a first control command for the first vehicle; sending the first control command to a vehicle controller of the first vehicle; and adjusting, by the vehicle controller based on the first control command, a position or a velocity of the first vehicle.

In some embodiments, the performing the local sensor fusion comprises: estimating a point cloud by removing a ground plane portion from the first lidar data to obtain a second point cloud; identifying an initial estimated position and initial estimated velocity, in first local coordinates, of the first vehicle by a clustering of the point cloud based on a clustering radius.

In some embodiments, the performing the local sensor fusion further comprises: estimating, based on the first radar data, an initial range to the first vehicle; determining an updated position and updated estimated velocity, in the first local coordinates, by applying a first local Kalman filter to the initial estimated position, the initial estimated velocity and the initial range; and converting the updated position and updated estimated velocity to global coordinates to obtain local data.

In some embodiments, the performing the local sensor fusion further comprises: estimating the point cloud by removing the ground plane portion by: when the initial range is less than a first range threshold, estimating the ground plane portion based on: the clustering radius, wherein the clustering radius is a first clustering radius, and a first bounding volume, when the initial range is not less than the first range threshold and is less than a second range threshold, estimating the ground plane portion based on: the clustering radius, wherein the clustering radius is a second clustering radius, and a second bounding volume, when the initial range is not less than the second range threshold and is less than a third threshold, estimating the ground plane portion based on: the clustering radius, wherein the clustering radius is a third clustering radius, and a third bounding volume, and when the initial range is greater than the third threshold, estimating the ground plane portion as non-existent; and obtaining the local data, at least in part, by removing the ground plane portion from the point cloud.

In some embodiments, the first range threshold is 50 meters, dimensions of the first bounding volume in x-coordinates, y-coordinates and z-coordinates are 8, 50, and 6 meters, respectively, and the first clustering radius is 1.0 meter.

In some embodiments, the second range threshold is 120 meters, dimensions of the second bounding volume in x-coordinates, y-coordinates and z-coordinates are 8, 70, and 6 and meters, respectively, and the second clustering radius is 1.5 meters.

In some embodiments, a third range threshold is 200 meters, dimensions of the third bounding volume in x-coordinates, y-coordinates and z-coordinates are 8, 80, and 6 meters, respectively, and the third clustering radius is 2.0 meters.

In some embodiments, the receiving, at the local computing device, first lidar data and first radar data, comprises receiving the first lidar data and the first radar data from a first road side unit (RSU).

In some embodiments, the method further comprises sending local data from the local computing device to a central computing device; receiving, at a second local computing device from a second RSU, second lidar data and second radar data related to the first vehicle; performing a second local sensor fusion at the second local computing device; sending second local data based on global coordinates from the second local computing device to the central computing device; receiving at the central computing device the local data and the second local data; and determining, based on a global fusion at the central computing device of the local data and the second local data, the HD map, wherein the HD map indicates a position and velocity, in global coordinates, of the first vehicle.

In some embodiments, the local computing device, the second local computing device and the central computing device are geographically distributed.

In some embodiments, the local computing device, the second local computing device and the central computing device are geographically co-located.

In some embodiments, the method further comprises identifying, by the local computing device, an estimated position and estimated velocity, in first local coordinates, of the first vehicle by a clustering of a point cloud based on a clustering radius; converting the estimated position and the estimated velocity to global coordinates; and sending the position in global coordinates and the velocity in global coordinates to a central computing device, wherein the central computing device is located within the first vehicle.

In some embodiments, the method further comprises transmitting the HD map from the first vehicle to a second vehicle, wherein the one or more autonomous vehicle comprises the second vehicle.

Also provided herein is a local computing device comprising: a communication interface; and at least one processor configured to: receive, via the communication interface, first lidar data and first radar data related to a first vehicle of one or more autonomous vehicles; perform a local sensor fusion at the local computing device, wherein the local sensor fusion includes removing a ground plane associated with the first vehicle based on a range to the first vehicle, and determine, based on the local sensor fusion, a high definition (HD) map, wherein the HD map indicates a position and velocity of the first vehicle.

Also provided herein is a non-transitory computer readable medium comprising instructions for execution by a processor in a local computing device for causing the local computing device to: receive, via a communication interface, first lidar data and first radar data related to a first vehicle of one or more autonomous vehicles; perform a local sensor fusion at the local computing device, wherein the local sensor fusion includes removing a ground plane associated with the first vehicle based on a range to the first vehicle, and determine, based on the local sensor fusion, a high definition (HD) map, wherein the HD map indicates a position and velocity of the first vehicle.

BRIEF DESCRIPTION OF THE DRAWINGS

FIG. 5A illustrates exemplary logic for removal of a ground plane from lidar data based on range.

FIGS. 5B, 5C, and 5D illustrate exemplary parameters and pseudocode for removal of a ground plane from lidar data based on range.

DETAILED DESCRIPTION

Raw data in the form of lidar data and/or radar data from one or more RSUs is processed with local processing by a local computing device to perform local detection and tracking using local coordinates. The lidar data may be referred to herein as a lidar point cloud. The radar data may be referred to as a radar point cloud.

In some embodiments, there may be many vehicles, many obstacles and many RSUs in general. For example, the number of vehicles may be on the order of 100 in number, the number of obstacles on the order of 100 and the number of RSUs may be of an order similar to the number of vehicles.

The local computing devices process lidar image representations (lidar point clouds) of an object in a field of view of one or more RSUs. In some embodiments, lidar and radar sensors may be deployed on a mobile vehicle. The mobile vehicle may travel on a roadway and obtain lidar data and radar data.

Example processing by a local computing device includes detection of whether a vehicle to be controlled and/or obstacle is at a near range (e.g. 25 m (meters)), a middle range (50 m), a long range (less than 200 m) or beyond long range (more than 200 m). After detecting the range, the local computing device detects, based on the range, a ground plane portion of a lidar point cloud and removes it to obtain a representation of the vehicle to be controlled or obstacle. The ground plane, in some embodiments, is not detected if the range is greater than 200 m.

Figure 1A:
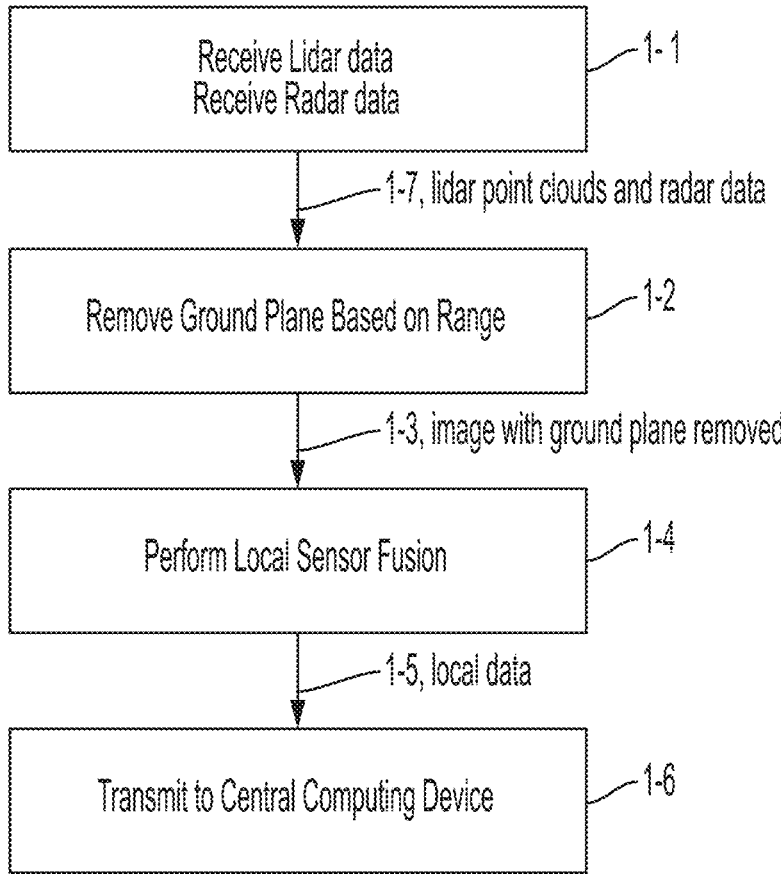
FIG. 1A illustrates exemplary logic for removing a ground plane based on range and performing local sensor fusion.

As shown in the logical flow of FIG. 1A at 1-1, lidar data and radar data 1-7 are received via the DDS protocol, in some embodiments. A cluster radius is established based on range and ground plane is removed at 1-2 and an image with ground plane removed 1-3 is obtained. Then local sensor fusion is performed at 1-4. Finally, at 1-6, identified position and velocity is transmitted as 1-5 to a central computing device.

For example, based on a range determined from the radar data, a ground plane portion of the lidar data is removed in order to improve detection of the target vehicle and/or obstacle. Clustering is applied using, for example, association and a global nearest neighbor (GNN) algorithm, in order to detect the target object. Further details of association and GNN can be found in "Introduction to Data Association," CSE598C, Fall 2012, Robert Collins, URL http://www.cse.psu.edu/~rtc12/CSE598C/datassocPart1.pdf. Hereinafter "GNN Reference." Downloaded Nov. 13, 2020. Position data with respect to the RSU (local coordinates) is obtained by fusing the clustered lidar data and the clustered radar data using a Kalman filter. Further details of Kalman filtering can be found in "An Introduction to the Kalman Filter," Greg Welch, Gary Bishop, University of North Carolina at Chapel Hill, Siggraph 2001, URL http://www.e-s.unc.edu/~tracker/media/pdf/SIGGRAPH2001_CoursePack_08.pdf. Hereinafter "Kalman Reference." Downloaded Nov. 13, 2020.

Figure 1B:
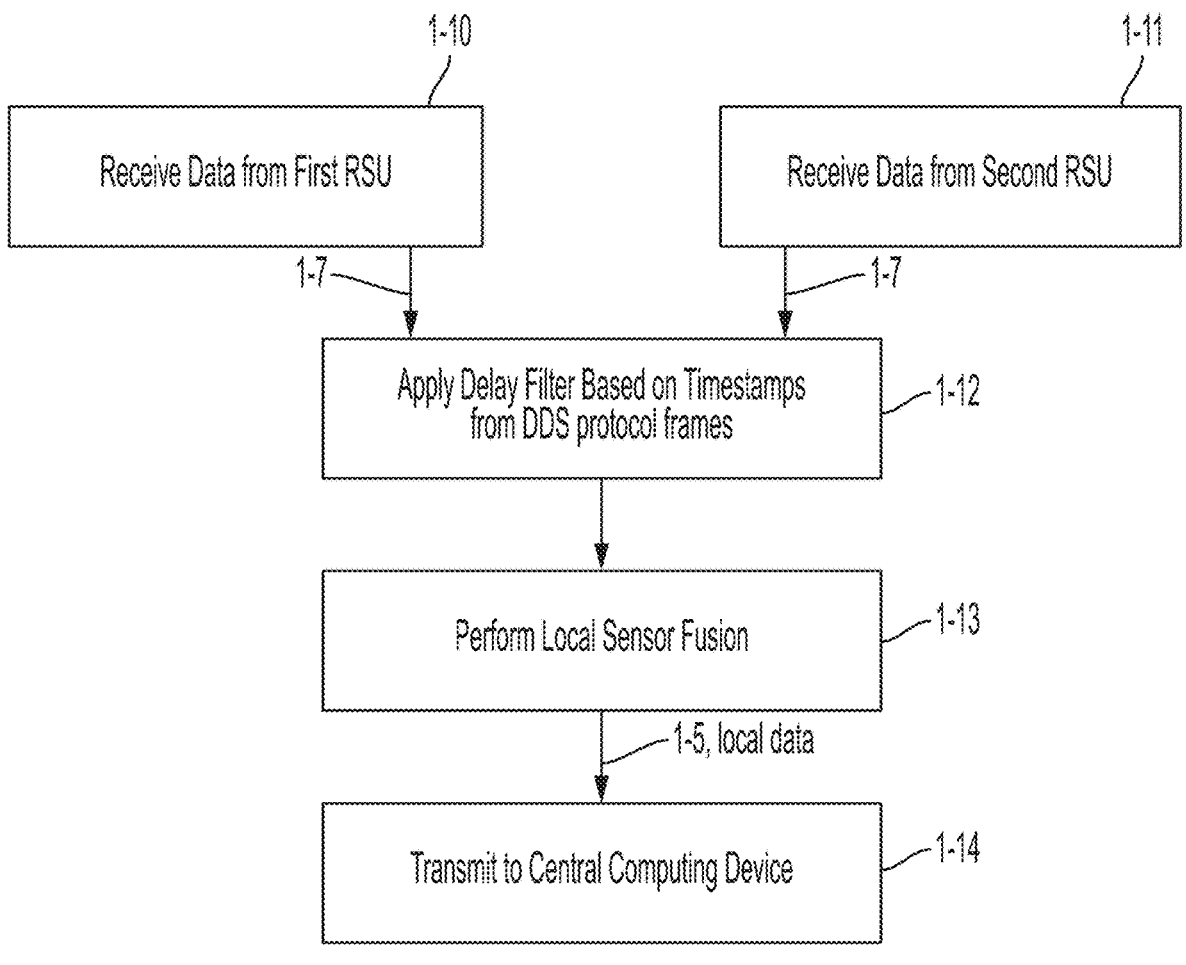
FIG. 1B illustrates exemplary logic for applying a delay filter and performing local sensor fusion.

As shown in the logic flow of FIG. 1B, a local computing device may receive data 1-7 at 1-10 from a first RSU and data 1-7 at 1-11 from a second RSU. The central device may apply a delay filter at 1-12 based on timestamps in the data 1-7 received from the RSUs (there may be RSU, two, or any number of RSUs). In some embodiments, the delay filter is configured to discard data based on a time difference comparison with a time threshold. In some embodiments the time threshold is 50 milliseconds (50 ms). Thus, the delay filter may discard some data. The local computing device may then perform local sensor fusion at 1-13 and send identified position and velocity, as local data 1-5, to the central computing device at 1-14.

Generally, in some embodiments, sensors of an RSU observe an obstacle (obstacle vehicle or other obstacle such as a tree) and/or a target vehicle to be controlled. The RSU sends data to a local computing device. The local computing device receives the data as lidar data and radar data in a DDS frame or stream. Further details of DDS may be found at http://www.omg.org/spec/DDS/. Downloaded Nov. 20, 2020. Hereinafter "DDS Reference." An example utility for implementation of DDS is RTMaps from the Intempora company. RTMaps is a component-based software development and execution environment which enables actions of time-stamp, record, synchronize and play back data from various sensors and vehicle buses.

The DDS bandwidth is most restricted by the infrastructure of communication, such as the Ethernet speed or wireless service. DDS methods (e.g., DDS frames or streams compliant with a DDS protocol) can divide a large samples into smaller packets before a device (RSU) sends out the sample. On the receiver side (e.g., the local computing device), the DDS protocol will put these smaller packet into the original, large sample. The bits per sample in DDS depend on the application. The DDS method is capable of, depending on method configuration, sending and receiving an array of numbers that is higher than 2 MB (2 Mega Bytes, where a byte is 8 bits) in size.

The samples per second used in DDS depends on the configuration of the DDS method. Sending the samples at 20 Hz or higher frequency is feasible. The DDS method can also be configured such that a sample is sent out at much lower frequency such as 1 Hz.

In some embodiments, the DDS frames or streams of the DDS method are configured the such that no sample is sent at all when the lidar data and/or radar data is not updated at an RSU.

In some embodiments, the DDS function "NeverSkipping (KeepAll+Volatile+Reliable)" QoS is used. This QoS setting is an example of having high quality communication of data. The QoS can be changed according to the needs of application and can be changed to other QoS configurations. The use of DDS permits provides flexibility in embodiments for configuring a system.

The local computing device uses a global nearest neighbor (GNN) algorithm to associate new measurements and a local Kalman filter to fuse two observations of the same object (vehicle to be controlled or obstacle). In some embodiments, the local computing device produces the HD map.

A list is maintained at the local computing device. The list, including local position and local velocity information for each vehicle to be controlled or obstacle being tracked is sent from the local computing device to a central computing device. The list is part of a stream of data sent using, in some embodiments, UDP.

The central computing device performs a global sensor fusion and creates a global list. Position and trajectory, in a global coordinate system, are provided for each object in the global list. The global sensor fusion algorithm is also performed using GNN and Kalman filter. The output of the global Kalman filter is an HD map in real time.

The HD map is provided to a vehicle control device of a vehicle to be controlled, which in turn communicates with clients in one or more vehicles to be controlled to control vehicle positions and motions.

Figure 2:
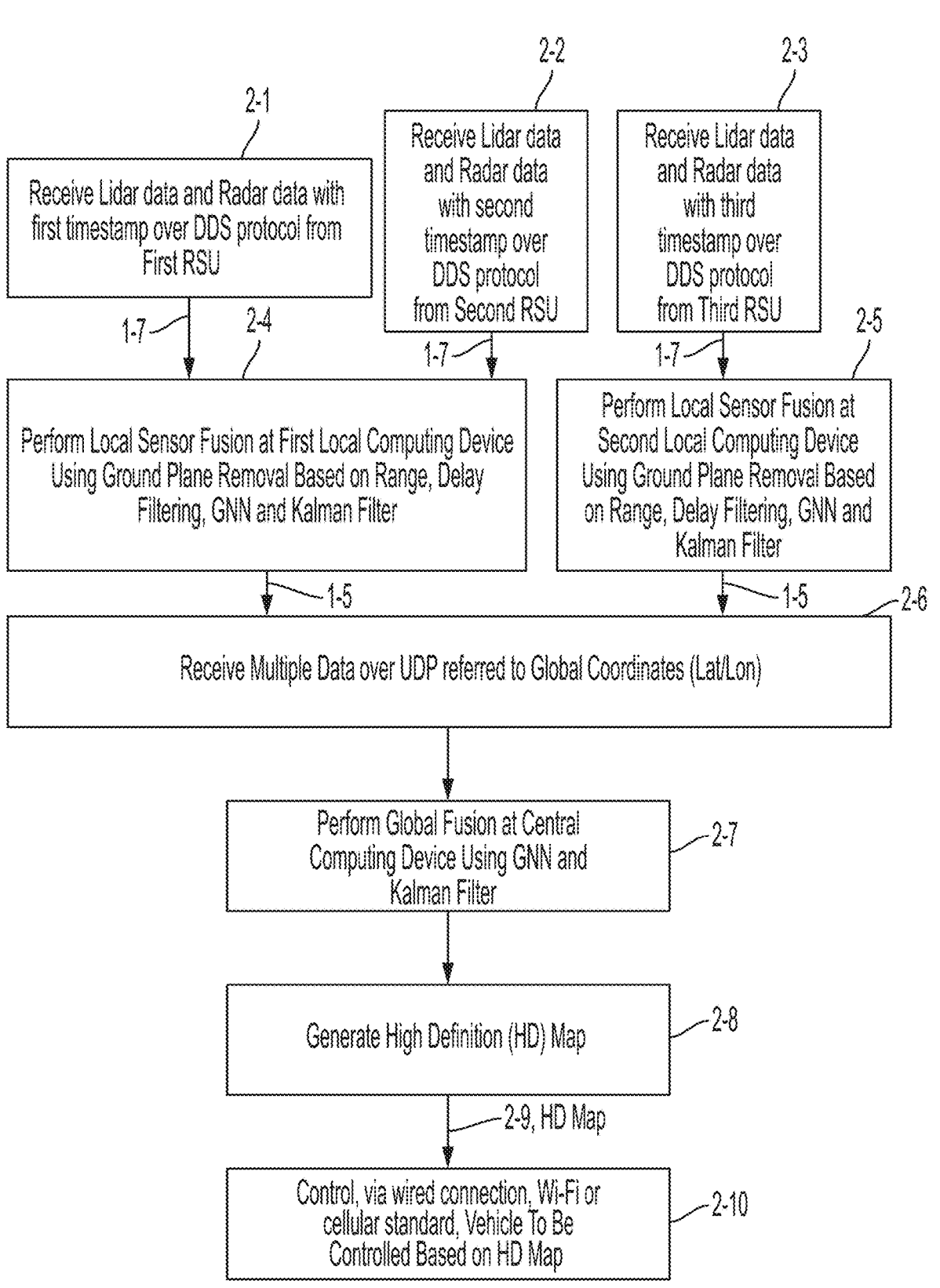
FIG. 2 illustrates exemplary logic for receiving lidar data and radar data from several RSUs, performing local sensor fusion at multiple local computing devices, performing global sensor fusion, and controlling a vehicle.

For example, as shown in the logic flow of FIG. 2, several RSUs may send lidar data and radar data 1-7 to several local computing devices (see 2-1, 2-2 and 2-3). In FIG. 2, a first local computing device receives data from two RSUs at 2-4 and applies a delay filter and removes a ground plane based on range. Local sensor fusion is performed using GNN and a Kalman filter. Also lidar data and radar data are received from a third RSU at a second local computing device at 2-5. Each local computing device updates position estimates to be based on global coordinates (lat/lon). At 2-6 the central computing device receives multiple data 1-5 over UDP, in some embodiments, from the first local computing device and the second local computing device. The central computing device at 2-7 performs global fusion using GNN and a Kalman filter. Then an HD map 2-9 is created at 2-8. Finally, at 2-10, a vehicle to be controlled is controlled based on the HD map.

Figure 3A:
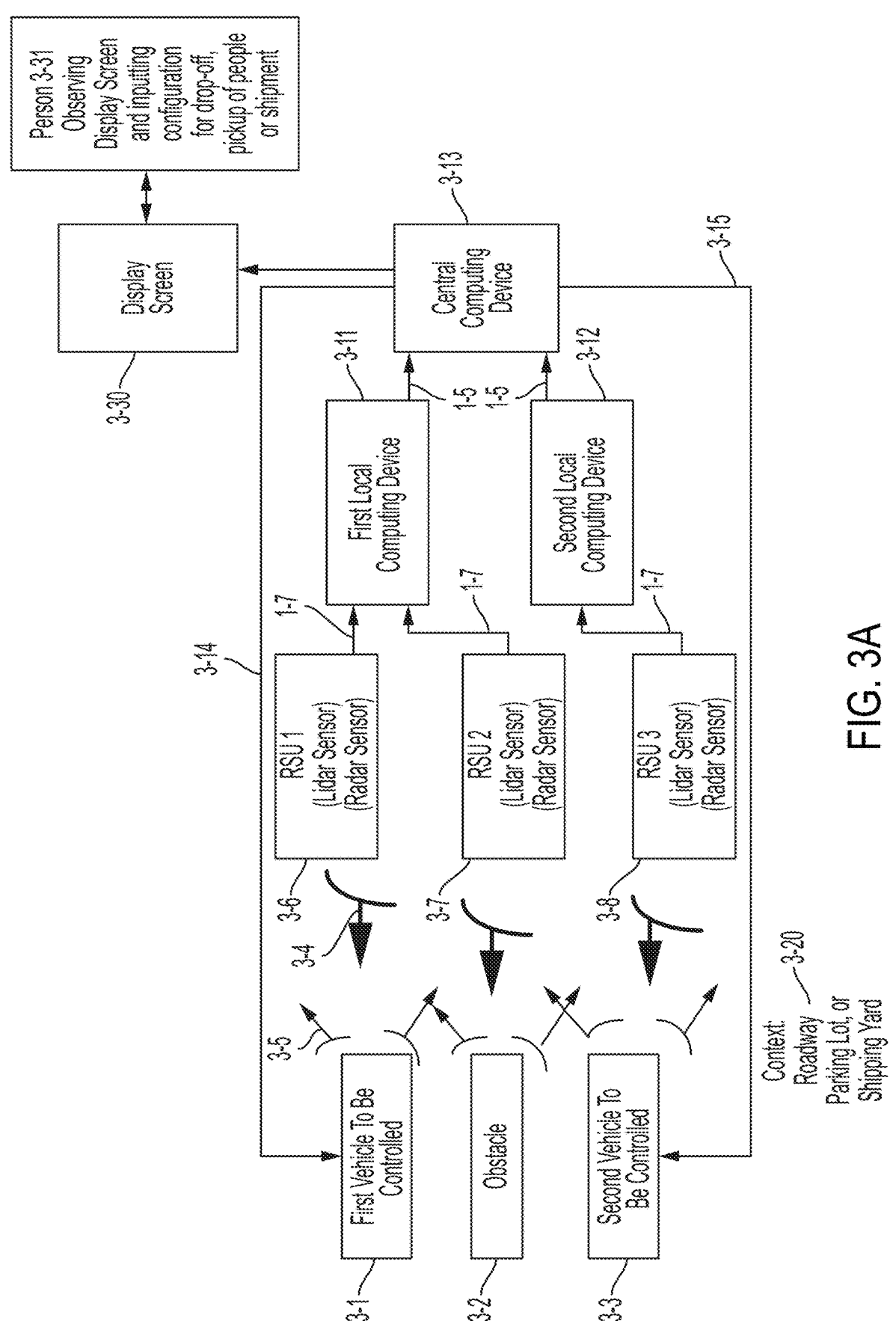
FIG. 3A illustrates an example system showing several vehicles, an obstacle, several RSUs several computing devices, a central computing device, and a display screen.

Another example is illustrated in terms of the system of FIG. 3A which is in a context of a roadway, parking lot or shipping yard (generally referred to as 3-20). RSUs 3-6, 3-7 and 3-8 operate lidar and radar sensors (transmissions 3-4 shown with a heavy line). Reflections or scattering occur from two vehicles 3-1, 3-3 and an obstacle 3-2. The reflections and scattering are indicated generally as 3-5. The sensors observe some of the reflections and send data 1-7 to the local computing devices 3-11 and 3-12. The local computing devices perform local fusion and send identified position and velocity as local data 3-5 to a central computing device 3-13. The central computing device 3-13 controls, for example, the two vehicles 3-1 and 3-3 via communication channels 3-15 and 3-15 in the example of FIG. 3A.

The fused data are converted from local coordinates with respect to each RSU to global coordinates (latitude, longitude sometimes referred to herein as "lat/lon") at a given local computing device. The fused data in lat/lon format are sent to the central computing device. The central computing device may be located within the target vehicle to be controlled. That is, there may be one central computing device for, for example, a parking lot, or there may be one central computing device within each vehicle operation in the parking lot (or a shipping yard or on a roadway).

The target vehicle to be controlled, the RSUs, the one or more local computing devices and the central computing device act as interacting elements and form a network. Signals, data and control messages flow between the elements of the network (see, for example, FIG. 3A). Embodiments provided herein solve timing, computing and control requirements for such a network. A working version of some embodiments has been built and tested (see FIGS. 3B, 5B, 5C, 5D, 6A, 6B, 6C and 11-14).

Generally, the communication between the elements (devices) can be adjusted according to the application of the system. That is, some communication routes or channels or bearers are not restricted to a certain type of communication.

To describe further, an RSU receives lidar and radar signals bounced off the vehicle to be controlled and/or off the obstacle. Sensors in the RSU convert received lidar and radar signals into numerical samples and send, in an embodiment, a representation of the samples to a local computing device in DDS frames or streams over a wired or wireless Ethernet connection. See FIGS. 3A and 3B.

In some embodiments, a communication channel between the central computing device and a vehicle to be controlled is wireless or wired connection depending on the location of the central computing device. When the central computing device is located in one of the vehicles to be controlled, the central computing device can be connected with the vehicle controller of that vehicle by a wired connection. When the central computing device is located outside of the vehicle to be controlled, the connection from the central computing device to the vehicle controller of the vehicle to be controlled will be wireless. See FIG. 3B (central computing device 3-13 in first vehicle 3-1, for example, can control first vehicle 3-1 and second vehicle 3-3).

The vehicle controller, in some embodiments includes a dSPACE Scalexio prototype control module and/or DataSpeed actuator control kit, or equivalents. See, for example, FIG. 10 item 10-6. The vehicle controller controls vehicle actuators, e.g. steering wheel, brake, accelerator, of the vehicle, see item 10-7 in FIG. 10. The vehicle controller also monitors the vehicle status, e.g. the speed of the vehicles. See FIG. 10.

In another embodiment, vehicle control is partially based in a network cloud. This in general means running the application not in a local device. For example, a part of the software algorithm from the vehicle control device is stored and executed in the cloud from the aforementioned prototype control modules. In that case, additional communication means in transmitting the data between the devices and the cloud are provided based on known techniques.

Generally, a communication a channel from any RSU to any local computing device can be DDS on a wired connection or DDS on a wireless connection. For more details on DDS, please see DDS Reference.

Figure 3B:
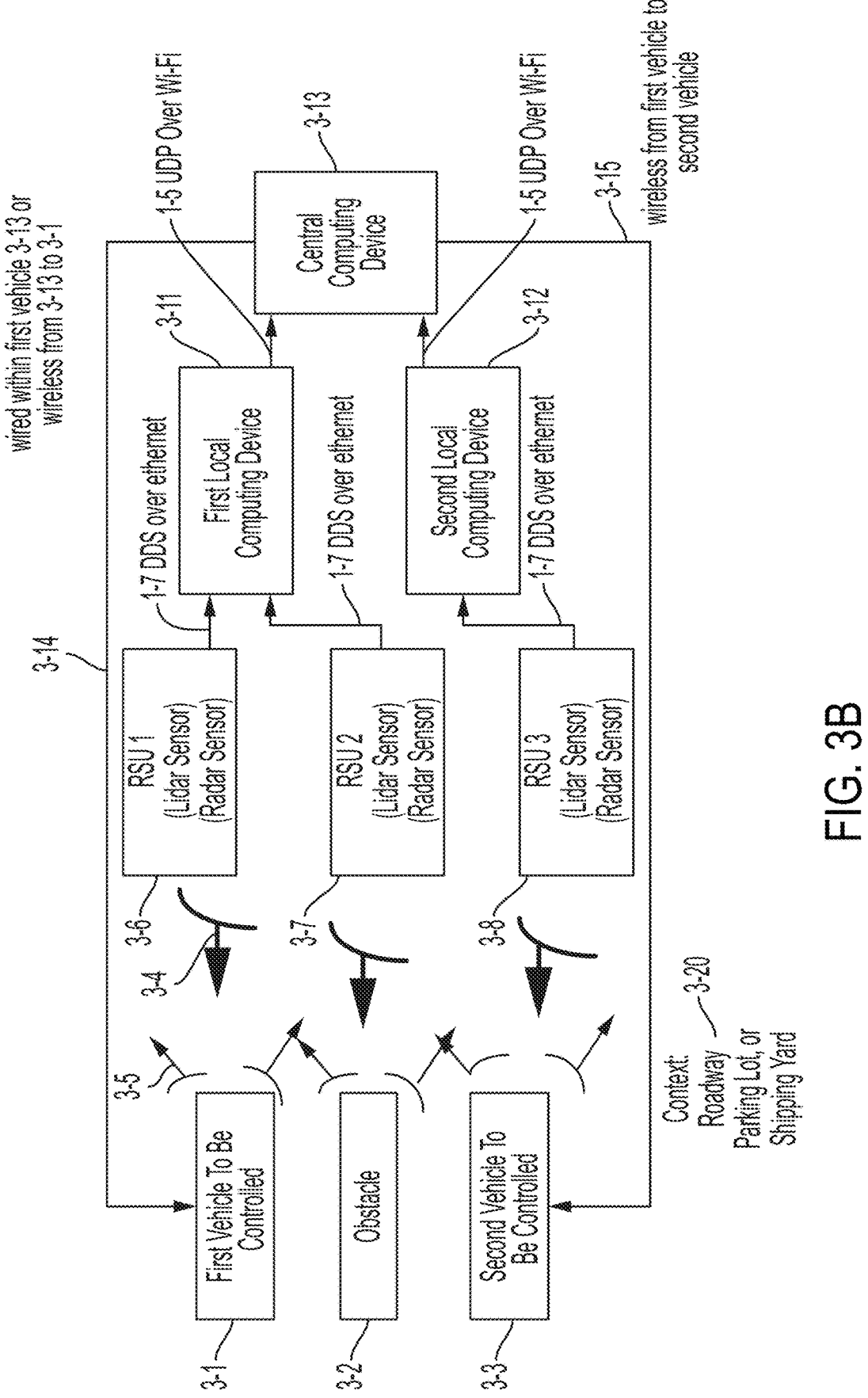
FIG. 3B illustrates an example system and selected example communication interfaces.

As shown in FIG. 3B, the data 1-7 may be communicated using the DDS protocol running over Ethernet. The local data 1-5 may be sent via the UDP protocol running over Wi-Fi (IEEE 802.11 local area network).

Figure 3C:
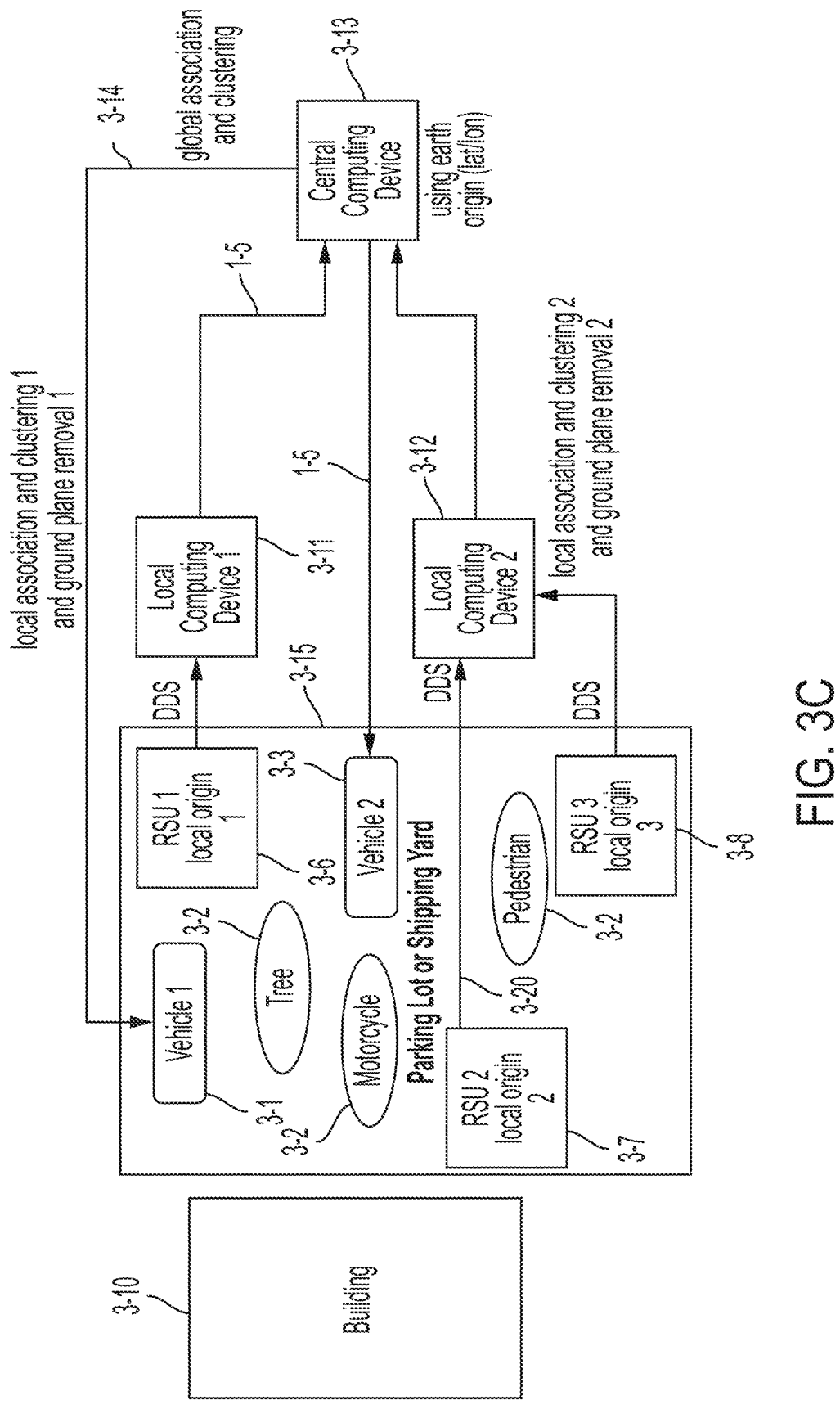
FIG. 3C illustrates an example system showing several vehicles, a tree, a motorcycle, a pedestrian, several RSUs several computing devices and a central computing device.

FIG. 3C is a more specific example of the systems illustrated in FIGS. 3A and 3B. The environment also includes a building 3-10. FIG. 3C illustrates an example system deployed with reference to a parking lot 3-20. In the example parking lot are a tree 3-2, a motorcycle 3-2, a pedestrian 3-2, a vehicle 1 (item 3-1) and a vehicle 2 (item 3-3) and an RSU 1 (item 3-6), an RSU 2 (item 3-7) and an RSU 3 (item 3-8). The RSUs communicate using the DDS protocol to a local computing device 1 (item 3-11) and a local computing device 2 (item 3-12). The local computing devices communicate with a central computing device 3-13. The central computing device controls the vehicle 1 and the vehicle 2. Some functions performed by the local computing devices and the central computing device are indicated in FIG. 3C.

Figure 3D:
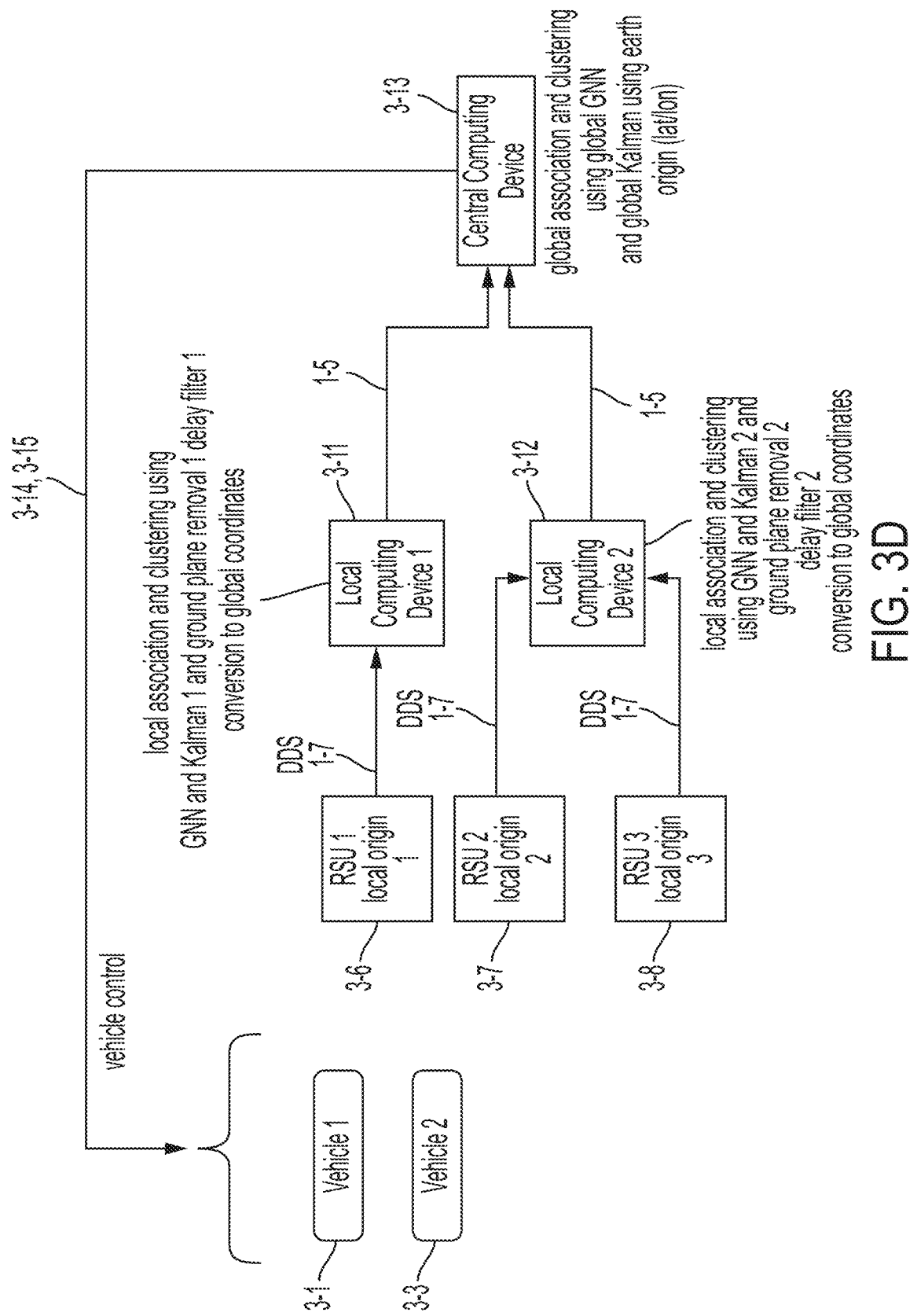
FIG. 3D illustrates an example system with identification of some of the functions performed at the local computing devices and the central computing device.

FIG. 3D is a functional illustration corresponding to FIG. 3C. Further functional descriptions are provided in FIG. 3D. The local computing devices 1 and 2 (items 3-11 and 3-12), in some embodiments, performs local association and clustering using GNN (see GNN Reference) and a Kalman filter (Kalman filters 1 and 2 in FIG. 3D, see Kalman Reference). The local computing device 2 applies a delay filter 2 to determine if either data 1-7 from RSU 2 or RSU 3 should be discarded. Local computing devices 1 and 2 perform ground plane removal, convert to global coordinates, and send local data 1-5 to the central computing device 3-13. The central computing device 3-13 performs global association and clustering (see GNN Reference) and Kalman filtering (see Kalman Reference) using coordinates with the earth origin (lat/lon). The central computing device 3-13 creates a HD map which is used to control the vehicles 3-1 and 3-3.

As discussed with respect to FIGS. 1A and 1B, the local computing device performs local sensor fusion to detect and track the vehicle to be controlled and/or the obstacle (there may be many of each). The local computing device, in an embodiment, sends position and velocity information of the vehicle to be controlled and/or the obstacle to the central computing device in UDP packets carried on a wireless or a wired link or communication channel. As mentioned above, the protocol for delivering the UDP packets, in some embodiments, is one of the protocols of the IEEE Wi-Fi (WLAN: wireless local area network) standard. Also, as an example, the communication channel between the local computing device and the central computing device may be implemented using software known as Matlab/Simulink Instrumentation Control.

Also as mentioned above, in some embodiments, time-stamps of arriving lidar data and radar data are compared between sensor information arriving from several RSUs. If lidar data and/or radar data in a DDS frame or stream is older than a threshold amount from other received data, the old data is discarded and not processed. See FIG. 1B. This achieves a delay filtering of the data using timestamps available in the DDS frames or streams and improves the accuracy of the detection and tracking occurring at the local computing device.

As mentioned above, the local computing device uses, in some embodiments, a Kalman filter to combine or fuse information from different sensors such as a radar sensor and a lidar sensor of an RSU.

Before the Kalman filter operates on the data, a GNN algorithm is applied to associate new information and to cluster points in the lidar data with a particular vehicle to be controlled and/or associates with an obstacle. The GNN algorithm evaluates each observation found in a bounding volume. See GNN Reference, slide 16, for example. The GNN algorithm identifies one or more clustered targets detected by lidar and/or radar data points within the bounding volume as suitable data to be input to the Kalman filter. The GNN algorithm is configured, in an example, to separately identify any vehicle to be controlled or obstacle which is separated from another target (e.g. vehicle or obstacle) by 1.5 m.

The Kalman filter is configured to weight the data from the sensors most heavily in circumstances in which the sensor performs the best. This provides more accurate and stable measurements than detection and tracking based on one kind of sensor alone. The adjustment of the weights is based on an estimated variance matrix.

Figure 4:
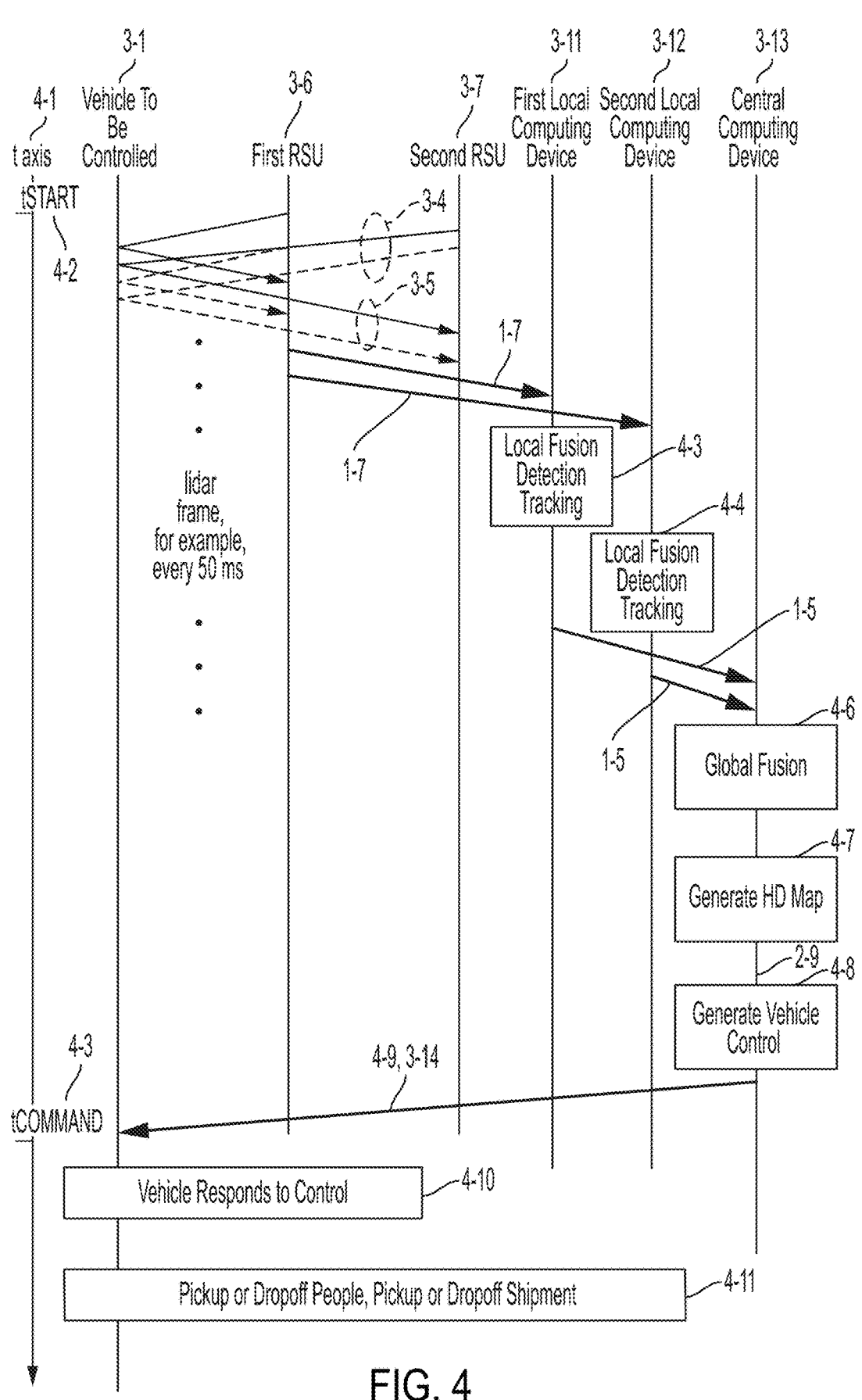
FIG. 4 is a ladder diagram illustrating signal, data, and control flow between network elements and over time.

FIG. 4 illustrates flow of signals, data and control in an example system. The communicating entities are listed across the top of FIG. 4. The system includes the vehicle to be controlled 3-1, the first RSU 3-6, the second RSU 3-7 the first local computing device 3-11, the second local computing device 3-12 and the central computing device 3-13. Time flows from top to bottom and a time axis 4-1 is provided on the left side of FIG. 4.

For a time reference, a time tSTART 4-2 is shown at the beginning of axis 4-1 and a time tCOMMAND 4-3 is shown at the end of 4-1. In an example, the time tCOMMAND– tSTART is approximately 50 milliseconds (50 ms).

As shown in FIG. 4 emitted signal 3-4 (laser light and/or electromagnetic waves) are sent out at time tSTART and scattered and reflected back as 3-5. The first and second RSU observe the scattered signals 3-5 and provide lidar data and radar data 1-7. The first and second local computing devices perform local fusion including detection and tracking of vehicles and obstacles. As part of this, ground plane removal based on range is performed, in some embodiments. The local computing devices then send local data 1-5 in lat/lon coordinates to the central computing device 3-13 which performs global fusion at 4-6. The central computing device 3-13 the generates an HD map 2-9 at 4-7. The HD map 2-9 is used at 4-8 to generate vehicle control commands at time tCOMMAND and these are transmitted as shown by 4-9, 3-14. At 4-10, the vehicle 3-1 responds to the control command and at 4-11 a purpose or result is achieved of picking up people, dropping off people, picking up a shipment or dropping off a shipment.

In some embodiments, using a reliable and efficient embedded architecture and OS system, a timing interval value from the first RSU sending the data to the time central computing device sending the general vehicle control will be within approximately 50 milliseconds.

As mentioned above, the events of timeline on the left of FIG. 4 occur then within on the order of approximately 50 ms (20 commands per second or 20 Hz command rate).

In another example, approximately 5 commands per second or 5 Hz corresponds to another embodiment. In this case, the events of the timeline occur within about 200 ms.

An exemplary lidar sensor may output a lidar point cloud frame at 20 FPS (frames per second). 20 FPS corresponds to one frame each 50 ms. As discussed above, then, 50 ms for the timeline permits every lidar frame to be processed, the HD map to be updated, and possibly a vehicle command to be sent, if needed.

In another embodiment, timing is not critical and a less efficient computation platform may be used, such as the Matlab/Simulink (Trademark) on a Windows (Trademark) system. Or the processing power may be dictated as an economic product implementation choice, as long as latency does not affect performance of the vehicle control. In the case of Matlab/Simulink onWindows, the time from the first sensor to sending the data to the time when the central computing device sends the vehicle control command will generally be longer than 50 ms.

As discussed with respect to FIG. 1A, at a local computing device, in some embodiments, a ground plane is removed from the lidar data while performing detection of the vehicle to be controlled and/or obstacle. Removal of the ground plane is achieved using a method shown in Table 1. Also see FIG. 5. The item being processed is called the "target" in Table 1.

TABLE 1

| Removing ground plane based on range. | | |
|---|---|---|
| Step | Action | Comment |
| 1 | Determine range of target from RSU which sent the lidar data. | |
| 2 | Selecting a clustering sized based on the range. In an example, the range is compared with three thresholds indicated as follows: short range, middle range, long range and beyond range. | |
| 3 | Apply the selected clustering size to the lidar data | See FIG. 12. |
| 4 | Identify, based on the clustered data, separately the target and the remaining image as the ground plane data. | |
| 5 | Retain target data and discard the identified ground plane data from the lidar data. | See FIG. 13. |
| 6 | Estimate the position of the target based on the retained target data. | |

As shown in the steps of Table 1, the point cloud which belongs to the ground plane will be detected first, and then those detected point clouds belonging to the ground plane are removed, leaving lidar data associated directly with one or more vehicles to be controlled and/or obstacles.

Similarly to Table 1, FIG. 5A illustrates exemplary logic for removal of a ground plane based on range at a local computing device.

In FIG. 5A a bounding box is a box or bounding volume put on the target. The bounding volume will reveal the size of target.

Also in FIG. 5A, an image is cropped with a template, such as the bounding volume mentioned above, in order to find the target. That is, the template is a three dimensional volume, in some examples. The left and right (x dimension), bottom and top (z dimension), near side and far side (y dimension) of the bounding volume are identified with different parameters depending on the range. See FIG. 5B. For example, z_min may correspond to the elevation of the roadway (0 meters). The range is known from the lidar data, therefore a distance within the image at a given range corresponds to a certain number of meters measured on or about the target itself at that range.

Specifically, in the logic flow of FIG. 5A, a range is determined at 5-1. This is a range from the RSU to the scattering object (vehicle or obstacle). This range is approximate, at this point the precise location of the scattering object is not known.

At 5-2, a clustering size is selected based on the range. The range may be compared, in an example, with three thresholds to determine a clustering size.

At 5-3, the selected clustering radius is applied to the lidar data 1-7.

At 5-4 the target (vehicle or obstacle) is separately identified from the ground plane. At 5-5, the target data is retained as a point cloud (image 1-3 with ground plane removed) and the identified ground plane point cloud is discarded.

At 5-6, the position of the target is precisely estimated based on the retained target data.

FIG. 5B illustrates examples ranges for short, mid, and long range modes of ground plane removal. FIG. 5B is an example and, as for other examples, FIG. 5B does not limit the embodiments.

FIG. 5B also illustrates example parameters for short range mode.

FIG. 5C illustrates example parameters for mid-range mode.

FIG. 5D illustrates example parameters for long-range mode.

The parameters of FIGS. 5B-5D include a parameter "clustering radius" or the like. Any point clouds whose distance is less than clusteringRadius will regarded as belong to the same target. For example, a center of mass may be found, and any point cloud within clusteringRadius is deemed to belong to the same target.

Table 2 illustrates example pseudocode for performance of ground plane removal based on range. In Table 2, pcfitplane( ) is a function to find out all of point clouds which belong to the ground plane. After that, if the return from the function call is not empty, all of these point clouds belonging to the ground plane are removed and the detected target is retained. Generally, "Pc" or "pc" means "point cloud."

TABLE 2

Finding the ground plane point cloud based on
range, and then retaining the target.

| Step | Action | Comment |
|------|--------|---------|
| 1 (short) | [-, In Plane Indices, outliers_short_mode] = pcfitplane(pc_short_mode, Ground_maxDistance, referenceVector); | |
| 2 (short) | If outliers_short_mode is not empty: Pc_short_mode = select(pc_short_mode, outliers_short_mode); | See FIG. 6C, FIG. 13 car 1 |

TABLE 2-continued

Finding the ground plane point cloud based on
range, and then retaining the target.

| Step | Action | Comment |
|------|--------|---------|
| 1 (mid) | [-, In Plane Indices, outliers_mid_mode] = pcfitplane(pc_mid_mode, Ground_maxDistance, referenceVector); | |
| 2 (mid) | If outliers_mid_mode is not empty: Pc_mid_mode = select(pc_mid_mode, outliers_mid_mode); | See FIG. 13 car 2 |
| 1 (long) | [-, In Plane Indices, outliers_long_mode] = pcfitplane(pc_long_mode, Ground_maxDistance, referenceVector); | |
| 2 (long) | If outliers_long_mode is not empty: Pc_long_mode = select(pc_long_mode, outliers_long_mode); | See FIG. 13 car 3 |

The function pcfitplane( ) of Table 2 is a software function provided by the Mathworks company. Mathworks is the developer of the Matlab and Simulink software tools. More information on identifying outliers can be found in, for example, "MLESAC: A New Robust Estimator with Application to Estimating Image Geometry" by P. H. S. Torr and A. Zisserman, published in Computer Vision and Image Understanding, vol. 78, pages 138-156 (2000).

In Table 2, the variable Ground_maxDistance defines a maximum distance from an inlier point to the plane, specified as a scalar value. It specifies the distance in units that are consistent with the units we are using for the point cloud, which meters for the embodiments presented herein. This scalar value defines how we determine if a point cloud fits with the ground plane by calculating the distance of the point to the ground plane. These points are called inliers if the distance is less than or equal to the Ground_maxDistance. On the contrary, those point not meeting the criteria are called the outliers.

In Table 2, referenceVector defines an orientation constraint. In some embodiments, referenceVector is a 1-by-3 vector. For example, when the normal vector is set to [0, 0, 1], this sets a constraint such that the ground plane's vector is the same as Z direction (i.e. the plane generated from the algorithm will be parallel to the X-Y plane).

In some embodiments, the recovered position and velocity in local coordinates of an RSU are converted at the local computing device to lat/lon. For Table 3 shown below, Earth Radius is about 6371 km. tCur_Long is the global coordinate (longitude and latitude) of the target. Earth Radius is used to calculate the tCur_Long. Please see Table 3.

TABLE 3

Converting to global coordinates. "p" stands for "position."
"pow(a, b)" means calculate $a^b$.

| Estimate | Conversion |
|----------|------------|
| 1 | Px_Global = cos(Local_to_Global_Azimuth) * Target_p_x + sin(Local_to_Global_Azimuth) * Target_p_y; Py_Global = -sin(Local_to_Global_Azimuth) * Target_p_x + cos(Local_to_Global_Azimuth) * Target_p_y; |
| 2 | Earth_Radius = sqrt(pow(pow(Earth_a, 2) * cos(tRef_Lat/180.0 * pi), 2) + pow(pow(Earth_b, 2) * sin(tRef_Lat/180.0 * pi), 2))/sqrt(pow(Earth_a * cos(tRef_Lat/180.0 * pi), 2) + pow(Earth_b * sin(tRef_Lat/180.0 * pi), 2)); |
| 3 | tCur_Long = tRef_Long + (Px_Global/(Earth_Radius * cos(tRef_Lat/180.0*pi))) * |

TABLE 3-continued

| Converting to global coordinates. "p" stands for "position." "pow(a, b)" means calculate $a^b$. | |
| --- | --- |
| Estimate | Conversion |
| | (180/pi); tCur_Lat = tRef_Lat + asin(Py_Global/Earth_Radius)/pi * 180; |

Velocities are obtained by computing a travelled distance and dividing by an elapsed time.

Figure 6A:
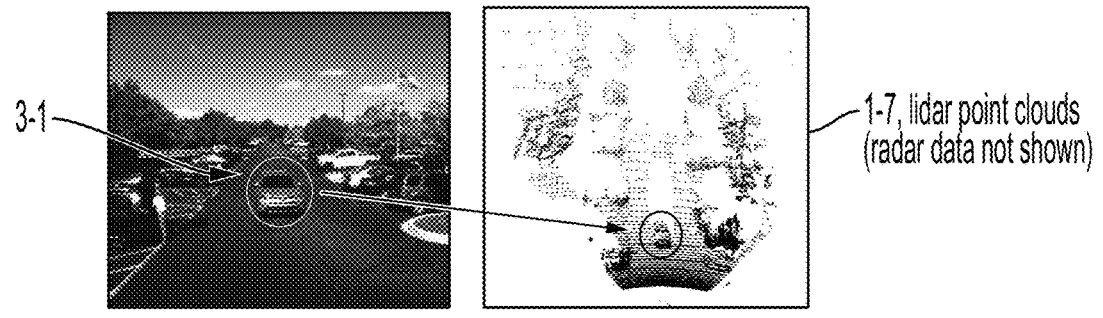
FIGS. 6A, 6B and 6C illustrate identification and removal of a ground plane from lidar data.
Figure 6B:
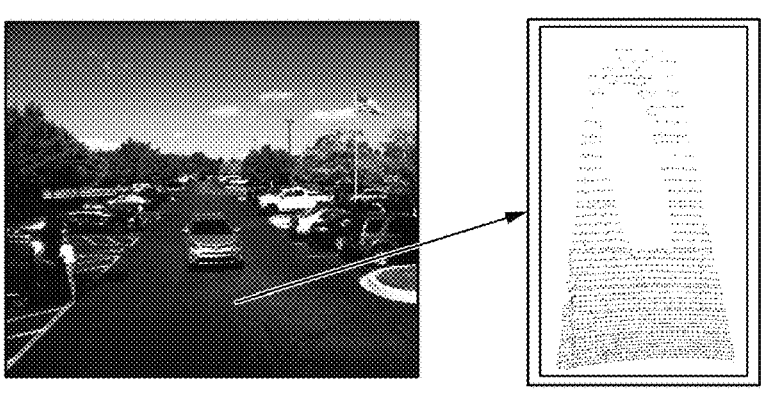
Figure 6C:
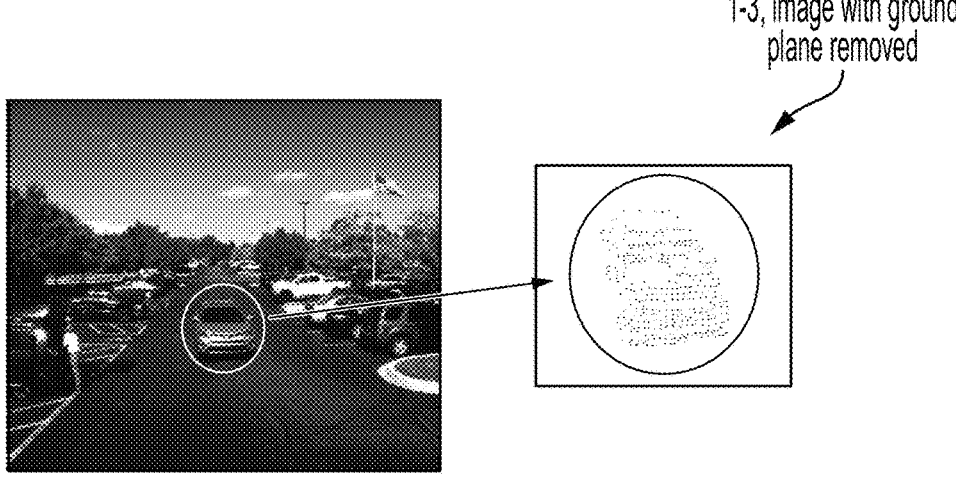

FIGS. 6A, 6B and 6C illustrate identification of a ground plane at short range and removal. FIG. 6A provides a camera image of a scene including a vehicle 3-1 and a corresponding lidar point cloud 1-7 collected of the scene.

FIG. 6B indicates the portion of the lidar data which corresponds to the ground plane in the camera image.

FIG. 6C indicates the portion of the lidar data 1-3 which corresponds to the vehicle after the ground plane is removed.

In some embodiments, the estimated position, velocity associated with a vehicle ID are sent from a local computing device to central computing device. In some embodiments, the data is sent from the local computing devices to the central computing device through a UDP block sender. The UDP block sender may be equivalent in function to the UDP block sender in a Matlab/Simulink Instrumentation Control Toolbox.

In some embodiments, the Matlab/Simulink Instrumentation Control Toolbox is replaced with the DDS format.

As mentioned above, the central computing device uses, in some embodiments, also uses a Kalman filter, in this case to combine or fuse information from different local computing devices. In some embodiments, each different local computing device provides a list of targets with position and velocity information in lat/lon coordinates.

Conceptually similar to the local computing device, the Kalman filter at the central computing device operates on the data information from different local computing devices, a GNN algorithm is applied to associate new information and to cluster identified vehicles and/or objects in the data received from several local computing devices. The GNN algorithm evaluates each observation within a particular bounding volume used at the central computing device. The GNN algorithm identifies one or more detected vehicles, one vehicle per the bounding volume used at the central computing device, as suitable data to be input to the Kalman filter at the central computing device.

Similarly to the Kalman filter at a local computing device, the Kalman filter at the central computing device is configured to weight the data from the local computing device based on a reliability or error variance matrix associated with the particular local computing device. This error variance matrix is updated with time.

The central computing device receives the UDP packets and determines an HD map by applying the Kalman filter at the central computing device. Positions and trajectory of one or more vehicles to be controlled and/or one or more obstacles are marked on the HD map.

The central computing device provides the HD map to a vehicle controller of a vehicle to be controlled. The vehicle controller issues control commands to the vehicle to be controlled such as control of a steering wheel, gas pedal and/or brakes. See FIG. 10. The commands in some embodiments are carried over Wi-Fi, a cellular telephone signal, or a wired cable (if the central computing device is installed in the vehicle to be controlled).

Alternatively, the central computing device, based on the HD map, issues commands to the vehicle controller of a vehicle to be controlled.

In some embodiments, the vehicle to be controlled and/or obstacle are travelling on a roadway.

In some embodiments, the vehicle to be controlled and/or obstacle are in a parking lot or in a shipping yard 3-20. The size of the parking lot or shipping yard 3-20 may be up to 300 m×300 m, in some embodiments.

For example, several vehicles may be in a parking lot; some are moving and some are stationary. The number of vehicles to be detected may be up to 100, in some embodiments. The number of vehicles to be tracked may be up to 35, in some embodiments. Vehicle speeds may be from 0 miles per hour (mph)(stationary) to 45 mph, in some embodiments. The vehicles may be small sedans, SUVs and/or semi-trucks, in some embodiments.

As mentioned above, obstacles 3-2 may be trees, pedestrians, other vehicles (e.g., motorcycles), for example.

A purpose of the vehicles may be to pick up a person, drop off a person, or pick up or drop off some kind of shipment.

As mentioned above, there may be one or more trees, pedestrians and/or motorcycles 3-2 in the parking lot 3-20. The parking lot may have drive paths which are predetermined beforehand and known to the central computing device. In an example, the drive paths are 6 m wide by 60 m long in a parking lot. There may be buildings near the parking lot (for example, 3-10). Several RSUs, in an embodiment, are deployed in and around the parking lot. The lidar sensors and radar sensors in the RSUs provide lidar data and sensor data. The lidar data and radar data is sent in DDS frames or streams over Ethernet connections to one or more local computing devices. The local computing devices perform delay filtering, ground plane removal and object detection and tracking.

In an embodiment, there are potentially several vehicles to be controlled and several obstacles. The local computing devices process multiple lidar data and radar data 1-7 from several RSUs to obtain position and velocity estimates 1-5 for one or more of the several vehicles to be controlled and obstacles in the parking lot or shipping yard 3-20.

Various numbers of RSUs may be connected to a local computing device. A local computing device may fuse data from two or more RSUs. Also a local computing device may fuse data (lidar data and radar data) from a single RSU.

The local computing devices send lists of target identifiers (IDs) associated with position information and velocity information to one or more central computing devices.

For example, at a central computing device 3-13 within a vehicle 3-1 in the parking lot 3-20, the lists are received from the local computing devices 3-11, 3-12. The central computing device 3-13 performs a global sensor fusion 2-7 on the local data 1-5 from the various local computing devices 3-11, 3-12. The central computing device 3-13 then updates a high definition map 2-9. Based on the HD map 2-9, the central computing device 3-13 may send commands, via channels 3-14, 3-15, to a vehicle controller 10-6 of the vehicle to be controlled 3-1.

In this way, the network of RSUs, local computing devices and one or more central computing devices control vehicles in the parking lot and permit the picking up or dropping off of people. Also the network permits unloading or loading of shipments from or onto the vehicles in the parking lot (or shipping yard). Collisions are reduced or avoided based on the accuracy of the HD map and the low delay, approximately 50 ms in some embodiments, from sending light and radio waves 3-4, receiving scatter or reflections 3-5, obtaining sensor data 1-7 to producing the HD map 2-9 and sending a control command.

In some embodiments, a customer control interface is provided which permits users of the system (i.e. the customers, the riders, depending on the application) to interact with the system according to the available application and the needs from the customers (pick-up service, assignment of destination, etc.).

Figure 7:
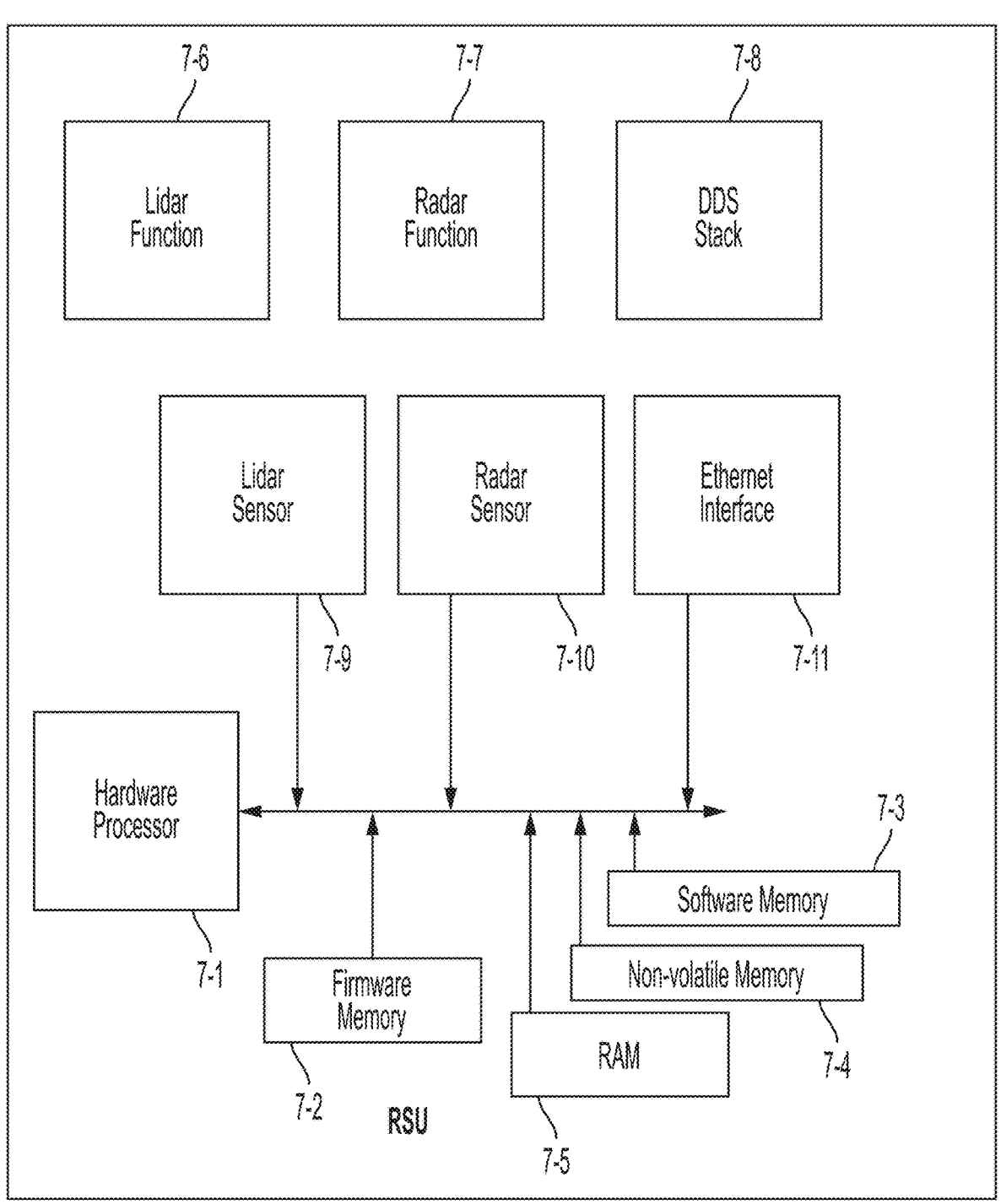
FIG. 7 illustrates exemplary functions and structure of an RSU.

FIG. 7 is an illustration of functions and structure of an exemplary RSU. The hardware processor 7-1 may be a CPU of Intel (Trademark) or ARM (Trademark) RISC architecture or an asic (application specific integrated circuit). FIG. 7 also illustrates lidar function 7-6, radar f unction 7-7, DDS stack 7-8, lidar sensor 7-9, radar sensor 7-10, Ethernet interface 7-11, firmware memory 7-2, RAM 7-5, non-volatile memory 7-4 and software memory 7-3. The non-volatile memory 7-4 is in general a non-transitory computer readable memory storing instructions for executing by the hardware processor 7-1 for performance of the functions of the RSU.

Figure 8:
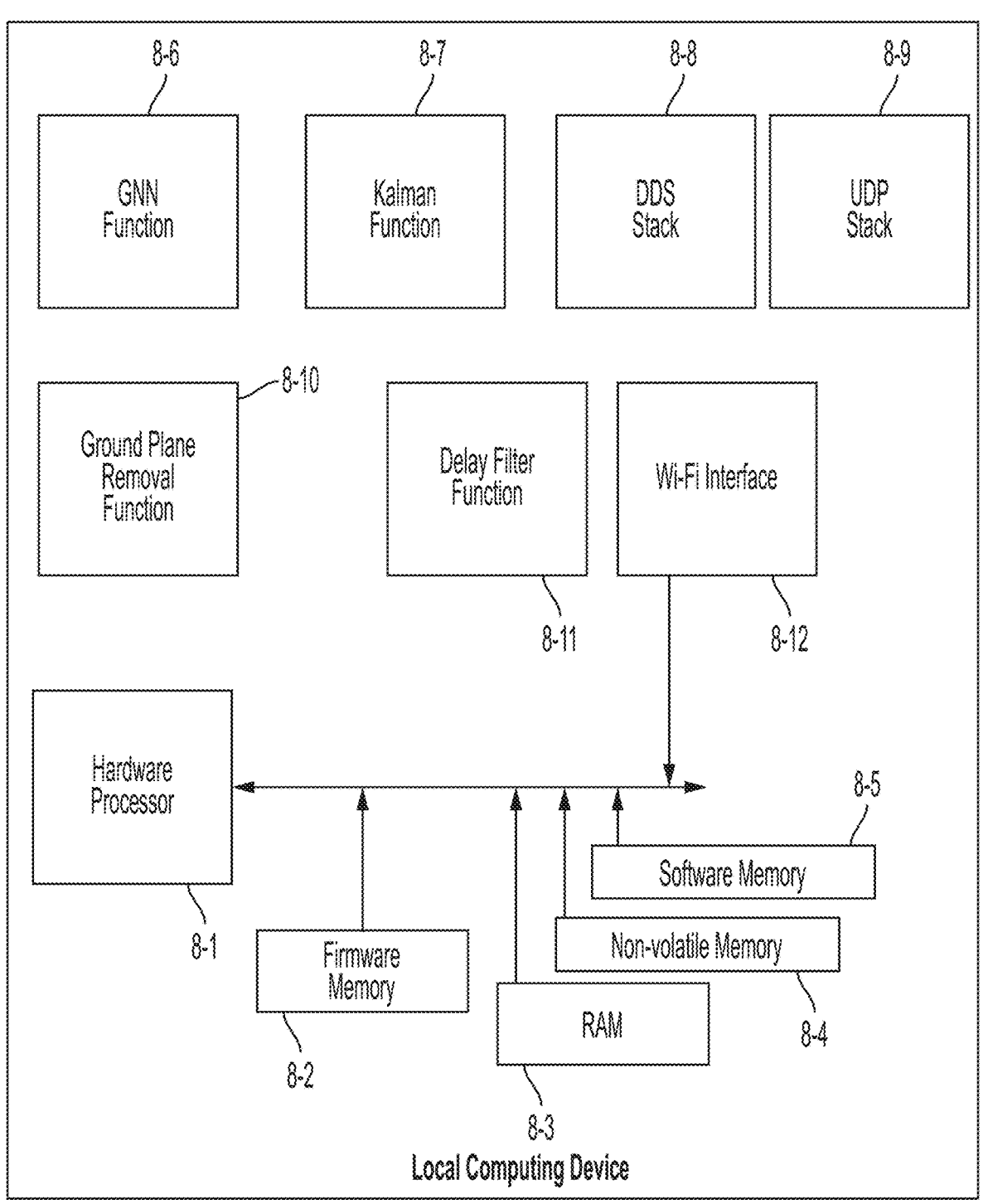
FIG. 8 illustrates exemplary functions and structure of a local computing device.

FIG. 8 is an illustration of functions and structure of an exemplary local computing device. Similar aspects of FIG. 7 are applicable to FIGS. 8, 9 and 10. For example, the hardware processor in each of FIGS. 8, 9 and 10 may be a CPU of Intel (Trademark) or ARM (Trademark) RISC architecture or an asic.

FIG. 8 illustrates a GNN function 8-6, Kalman function 8-7, DDS stack 8-8, UDP stack 8-9, ground plane removal function 8-10, delay filter function 8-11, Wi-Fi interface 8-12, hardware processor 8-1, as well as memories 8-2, 8-3, 8-4 and 8-5. The non-volatile memory 8-4 is in general a non-transitory computer readable memory storing instructions for executing by the hardware processor 8-1 for performance of the functions of the local computing device.

Figure 9:
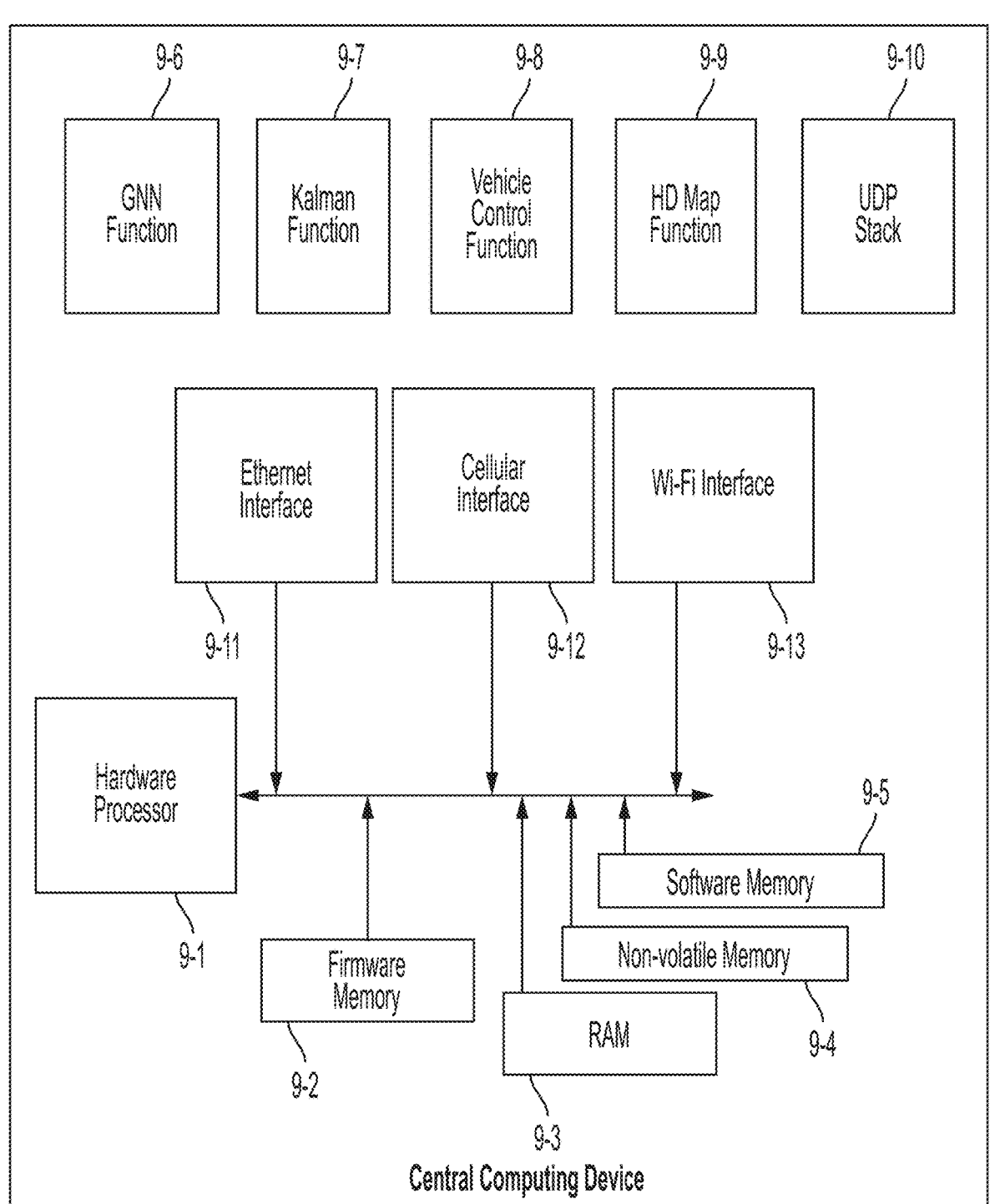
FIG. 9 illustrates exemplary functions and structure of a central computing device.

FIG. 9 is similar to FIG. 8. FIG. 9 illustrates a central computing device in terms of functions and structures. FIG. 9 illustrates a GNN function 9-6, Kalman function 9-7, vehicle control function 9-8, UDP stack 9-10, HD map function 9-9, Ethernet interface 9-11, cellular interface 9-12, Wi-Fi interface 9-13, hardware processor 9-1, as well as memories 9-2, 9-3, 9-4 and 9-5. The non-volatile memory 9-4 is in general a non-transitory computer readable memory storing instructions for executing by the hardware processor 9-1 for performance of the functions of the central computing device.

Figure 10:
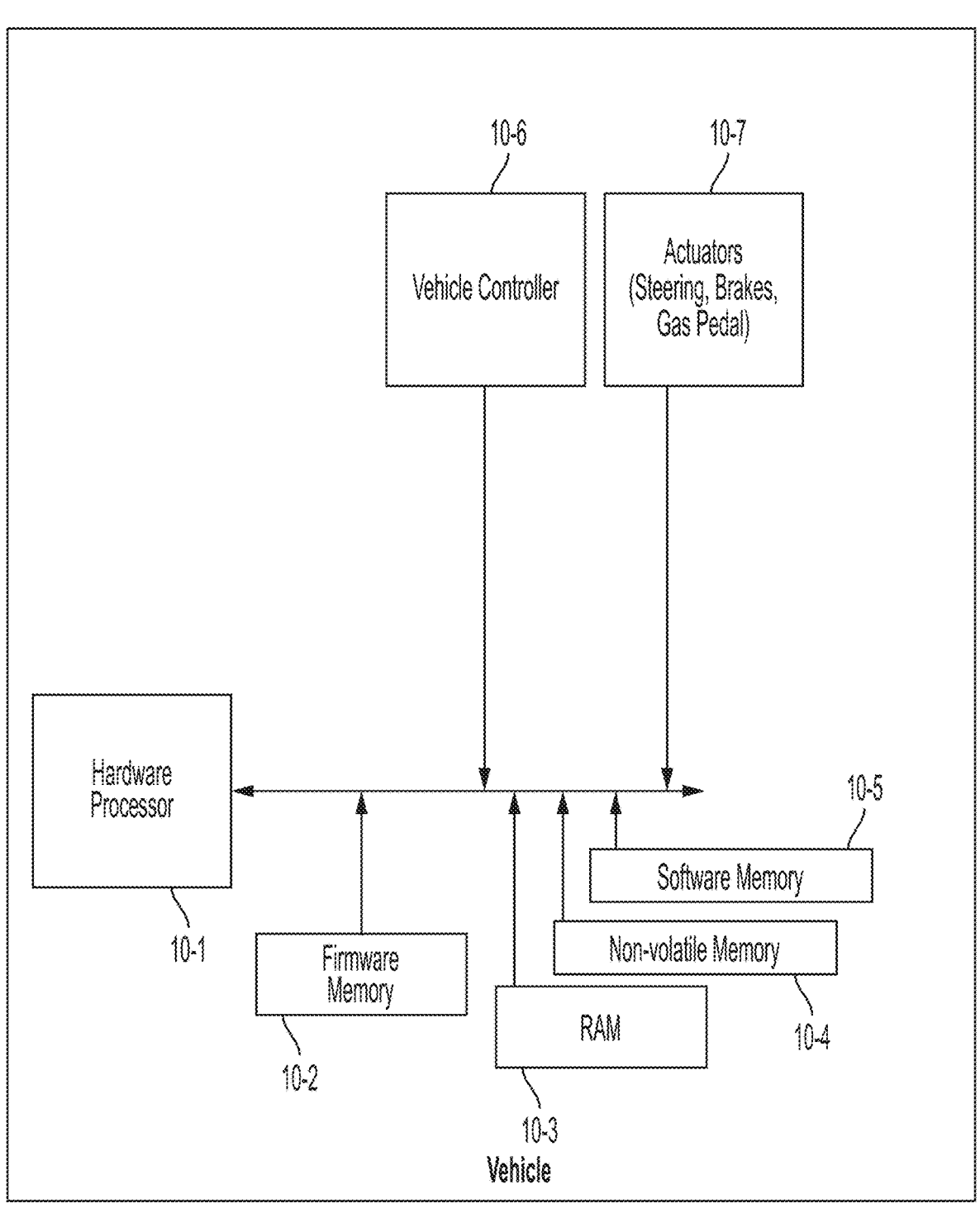
FIG. 10 illustrates exemplary functions and structure of a vehicle.

FIG. 10 is an illustration of functions and structure of an exemplary vehicle in terms of computation, communication and control aspects. FIG. 10 illustrates a hardware processor 10-1, a vehicle controller 10-6, actuators 10-7 (steering, brakes, gas pedal), and memories 10-2, 10-3, 10-4 and 10-5.

FIGS. 11-14 provide exemplary test information and example HD maps based on embodiments.

Figure 11:
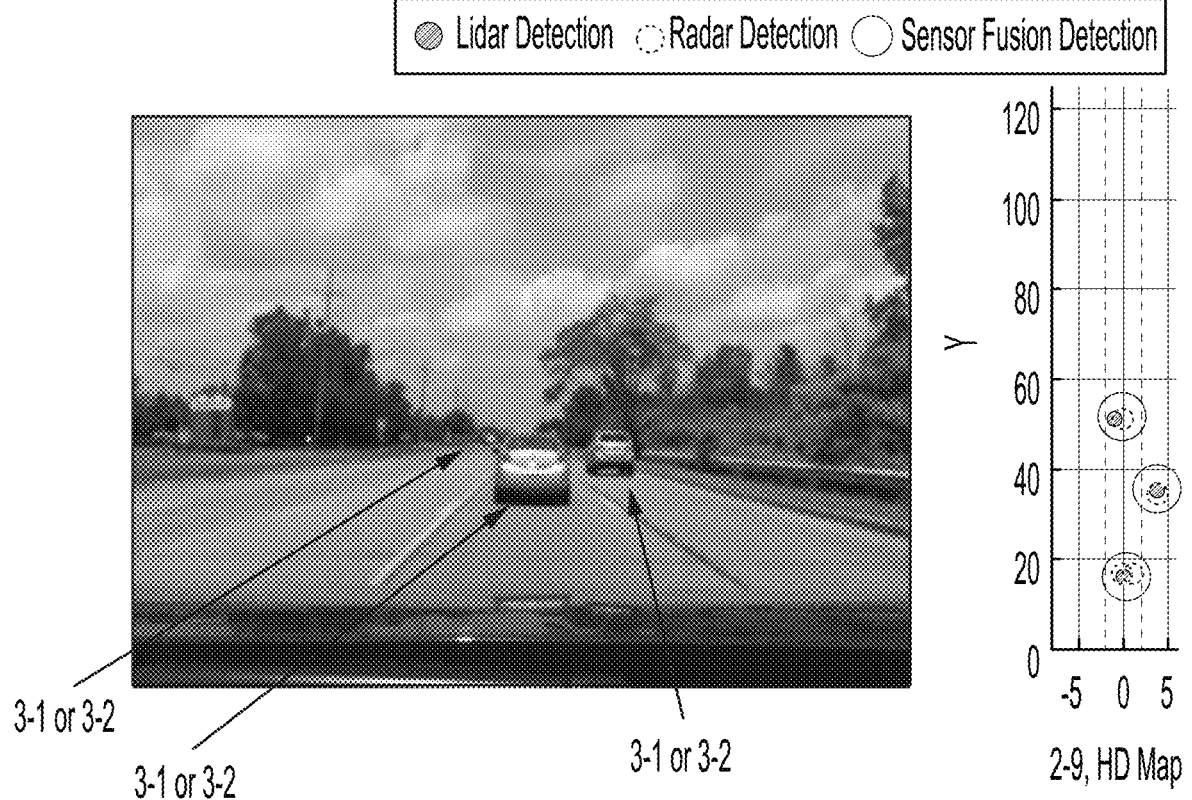
FIG. 11 illustrates an example of an HD map.

For example, FIG. 11 illustrates a system deployment with respect to collecting lidar data and radar data with a lidar sensor and radar sensor mounted in a vehicle. A camera image is on the left and vehicles to be controlled (or which are obstacles) are indicated as 3-1 or 3-2. An exemplary HD map 2-9 obtained based on processing the lidar data and radar data is shown on the right. A legend indicates lidar detection, radar detection, and sensor fusion detection indications on the HD map.

Figure 12:
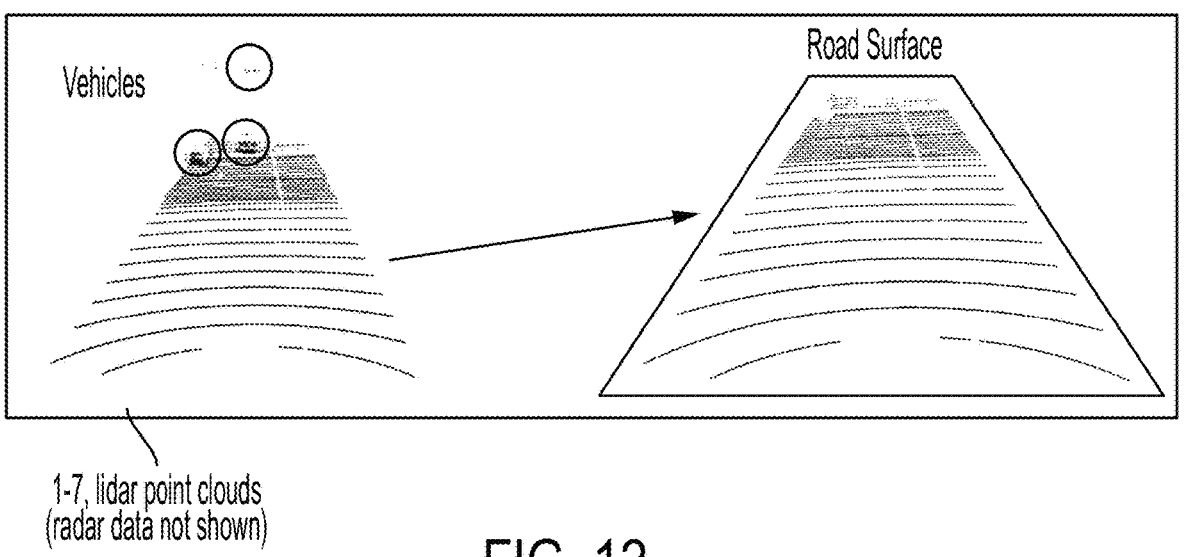
FIG. 12 illustrates short, medium and long range modes for ground plane removal.

FIG. 12 illustrates removal of ground plane for detection of each of three vehicles from FIG. 11. Point clouds 1-7 representing the three vehicles are shown on the left. Point clouds representing the road surface (ground plane) are shown on the right of FIG. 12.

Figure 13:
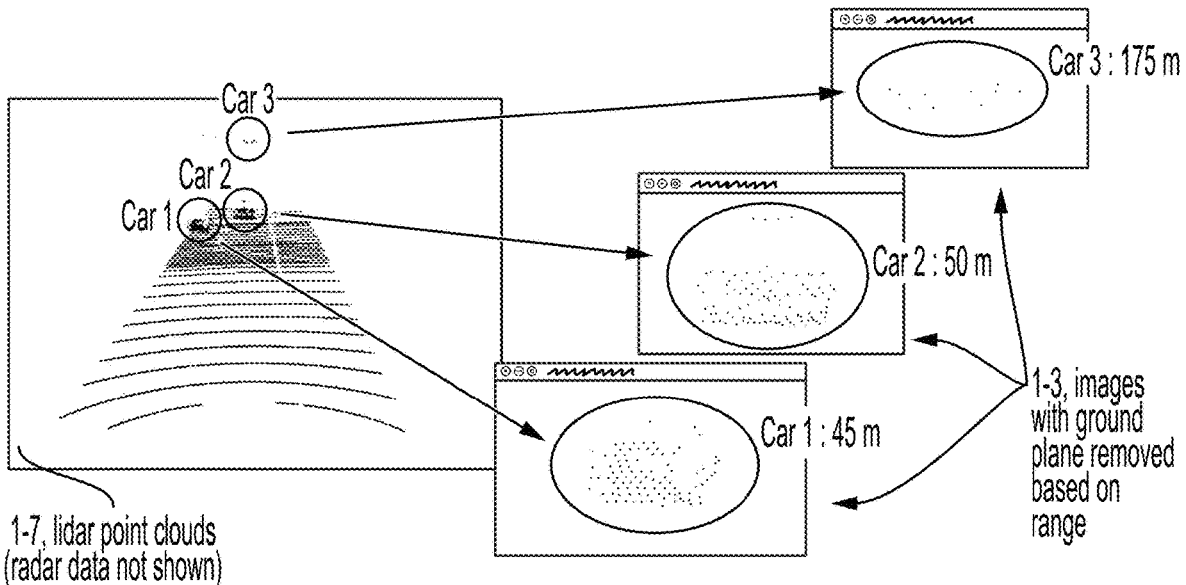
FIG. 13 illustrates identification of targets at short, medium and long range after ground plane removal.

FIG. 13 illustrates ground plane removal for short range, medium range and long range for the three vehicles of FIG.

11. Point clouds 1-7 representing the three vehicles are shown on the left. Exemplary retained target point clouds 1-3, sometimes referred to as images, are shown on the right.

Figure 14:
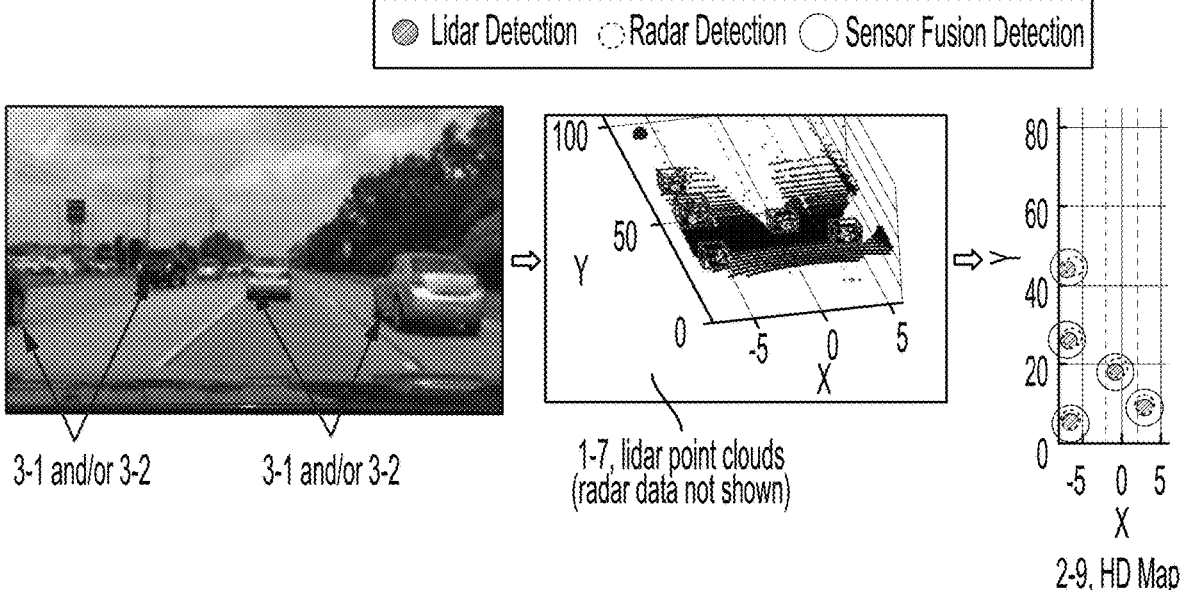
FIG. 14 illustrates an HD map.

FIG. 14 is an additional roadway example. A camera image is provided on the left showing vehicles/obstacles 3-1 and/or 3-2. Lidar data 1-7 is presented in the middle of FIG. 14. On the right of FIG. 14, an HD map 2-9 is provided showing the fusion of lidar data and radar data.

In some embodiments, visual display data is formed based on the HD map 2-9. See FIG. 3A item 3-30. The visual display data is sent to a display device coupled to the central computing device. A person may then monitor the visual display data by observing the display device. See FIG. 3A item 3-31. The person may take actions related to coordinating passenger pickup or drop-off of shipment pickup or drop-off.

The principles of fusing lidar and radar data have been illustrated by various embodiments. The principles of detecting and removing a ground plane based on range have been shown in various embodiments. The principle of delay filtering has been shown. As described herein, the principles provided above may be used in various contexts, such as roadways, parking lots and shipping yards. Location of sensors, local computing devices, central computing device and vehicle control may be combined in various ways as shown in the embodiments above.

What is claimed is:

1. A method for producing a high definition map (HD map) for control of one or more autonomous vehicles, the one or more autonomous vehicles including a first vehicle, the method comprising:

receiving, at a local computing device, first lidar data and first radar data related to the first vehicle;

estimating, based on the first radar data, an initial range to the first vehicle;

performing a local sensor fusion at the local computing device, wherein the local sensor fusion includes removing, based on a clustering radius associated with the first vehicle, a ground plane associated with the first vehicle, and determining, based on the local sensor fusion, the HD map, wherein the HD map indicates a position and a velocity of the first vehicle, a result of lidar detection of the first vehicle, and a result of radar detection of the first vehicle, wherein the clustering radius is set longer as a distance from a first road side unit to the first vehicle increases by comparing the initial range with one or more range thresholds and setting the clustering radius based on the comparing.

2. The method of claim 1, further comprising controlling, based on the position and the velocity indicated by the HD map, the first vehicle to navigate in a parking lot to pick up or drop off a person.

3. The method of claim 1, further comprising controlling, based on the position and the velocity indicated by the HD map, the first vehicle to navigate in a shipping yard to pick up or drop off a shipment.

4. The method of claim 1, further comprising:

receiving, at the local computing device, second lidar data and second radar data related to the first vehicle, wherein the performing the local sensor fusion further comprises:

applying a delay filter to compare timestamps of the first lidar data and the second lidar data, discarding the second lidar data when the comparison of the timestamps indicates a difference in timestamps more than a threshold time, and using, when the difference in timestamps is equal to or less than the threshold time, the second lidar data as an input of the local sensor fusion.

5. The method of claim 1, further comprising:

forming visual display data based on the HD map;

sending the visual display data to a display device; and displaying the visual display data on the display device for monitoring, by a person, of the first vehicle.

6. The method of claim 1, further comprising:

determining a first control command for the first vehicle;

sending the first control command to a vehicle controller of the first vehicle at a first time;

adjusting, by the vehicle controller based on the first control command, a position or a velocity of the first vehicle;

determining a second control command for the first vehicle; and sending the second control command to the vehicle controller of the first vehicle at a second time, wherein the first time and the second time correspond to a command rate of between 5 Hz and 20 Hz.

7. The method of claim 1, wherein the performing the local sensor fusion comprises:

estimating a point cloud by removing a ground plane portion from the first lidar data to obtain a second point cloud;

identifying an initial estimated position and initial estimated velocity, in first local coordinates, of the first vehicle by a clustering of the point cloud based on the clustering radius.

8. The method of claim 7, wherein the performing the local sensor fusion further comprises:

determining an updated position and updated estimated velocity, in the first local coordinates, by applying a first local Kalman filter to the initial estimated position, the initial estimated velocity and the initial range; and converting the updated position and updated estimated velocity to global coordinates to obtain local data.

9. The method of claim 8, wherein the one or more range thresholds comprises a first range threshold, a second range threshold and a third range threshold, and wherein the performing the local sensor fusion further comprises:

estimating the point cloud by removing the ground plane portion by:

when the initial range is less than a first range threshold, estimating the ground plane portion based on:

the clustering radius, wherein the clustering radius is a first clustering radius, and a first bounding volume, when the initial range is not less than the first range threshold and is less than a second range threshold, estimating the ground plane portion based on:

the clustering radius, wherein the clustering radius is a second clustering radius, and a second bounding volume, when the initial range is not less than the second range threshold and is less than a third threshold, estimating the ground plane portion based on:

the clustering radius, wherein the clustering radius is a third clustering radius, and a third bounding volume, and when the initial range is greater than the third threshold, estimating the ground plane portion as non-existent; and obtaining the local data, at least in part, by removing the ground plane portion from the point cloud.

10. The method of claim 9, wherein the first range threshold is 50 meters, dimensions of the first bounding volume in x-coordinates, y-coordinates and z-coordinates are 8, 50, and 6 meters, respectively, and the first clustering radius is 1.0 meter.

11. The method of claim 9, wherein the second range threshold is 120 meters, dimensions of the second bounding volume in x-coordinates, y-coordinates and z-coordinates are 8, 70, and 6 and meters, respectively, and the second clustering radius is 1.5 meters.

12. The method of claim 9, wherein a third range threshold is 200 meters, dimensions of the third bounding volume in x-coordinates, y-coordinates and z-coordinates are 8, 80, and 6 meters, respectively, and the third clustering radius is 2.0 meters.

13. The method of claim 1, wherein the receiving, at the local computing device, first lidar data and first radar data, comprises receiving the first lidar data and the first radar data from a first road side unit (RSU).

14. The method of claim 13, further comprising:

sending local data from the local computing device to a central computing device;

receiving, at a second local computing device from a second RSU, second lidar data and second radar data related to the first vehicle;

performing a second local sensor fusion at the second local computing device;

sending second local data based on global coordinates from the second local computing device to the central computing device;

receiving at the central computing device the local data and the second local data; and determining, based on a global fusion at the central computing device of the local data and the second local data, the HD map, wherein the HD map indicates a position and velocity, in global coordinates, of the first vehicle.

15. The method of claim 14, wherein the local computing device, the second local computing device and the central computing device are geographically distributed.

16. The method of claim 14, wherein the local computing device, the second local computing device and the central computing device are geographically co-located.

17. The method of claim 1, further comprising:

identifying, by the local computing device, an estimated position and estimated velocity, in first local coordinates, of the first vehicle by a clustering of a point cloud based on a clustering radius;

converting the estimated position and the estimated velocity to global coordinates; and sending the position in global coordinates and the velocity in global coordinates to a central computing device, wherein the central computing device is located within the first vehicle.

18. The method of claim 17, further comprising transmitting the HD map from the first vehicle to a second vehicle, wherein the one or more autonomous vehicle comprises the second vehicle.

19. A local computing device comprising:

a communication interface; and at least one processor configured to:

receive, via the communication interface, first lidar data and first radar data related to a first vehicle of one or more autonomous vehicles;

estimate, based on the first radar data, an initial range to the first vehicle;

perform a local sensor fusion at the local computing device, wherein the local sensor fusion includes removing a ground plane associated with the first vehicle based on a clustering radius associated with the first vehicle, and determine, based on the local sensor fusion, a high definition (HD) map, wherein the HD map indicates a position and velocity of the first vehicle, a result of lidar detection of the first vehicle, and a result of radar detection of the first vehicle, wherein the clustering radius is set longer as a distance from a first road side unit to the first vehicle increases by comparing the initial range with one or more range thresholds and setting the clustering radius based on the comparing.

20. A non-transitory computer readable medium comprising instructions for execution by a processor in a local computing device for causing the local computing device to:

receive, via a communication interface, first lidar data and first radar data related to a first vehicle of one or more autonomous vehicles;

estimate, based on the first radar data, an initial range to the first vehicle;

perform a local sensor fusion at the local computing device, wherein the local sensor fusion includes removing a ground plane associated with the first vehicle based on a clustering radius associated with the first vehicle, and determine, based on the local sensor fusion, a high definition (HD) map, wherein the HD map indicates a position and velocity of the first vehicle, a result of lidar detection of the first vehicle, and a result of radar detection of the first vehicle, wherein the clustering radius is set longer as a distance from a first road side unit to the first vehicle increases by comparing the initial range with one or more range thresholds and setting the clustering radius based on the comparing.

* * * * *